United States Patent [19]
Abbott

[11] Patent Number: 5,943,009
[45] Date of Patent: *Aug. 24, 1999

[54] GPS GUIDED MUNITION

[76] Inventor: Anthony Steven Abbott, 28336 Lumada Ridge Dr., Rancho Palos Verdes, Calif. 90275

[*] Notice: This patent is subject to a terminal disclaimer.

[21] Appl. No.: 08/890,384

[22] Filed: Jul. 11, 1997

Related U.S. Application Data

[63] Continuation-in-part of application No. 08/806,865, Feb. 27, 1997, Pat. No. 5,786,790.
[51] Int. Cl.$^6$ ................................................ G01S 7/185
[52] U.S. Cl. ............................. 342/357.02; 342/357.17
[58] Field of Search .......................... 342/357; 244/3.14, 244/3.19, 3.24; 701/214

[56] References Cited

U.S. PATENT DOCUMENTS

| | | | |
|---|---|---|---|
| 5,260,709 | 11/1993 | Nowakowski | 342/62 |
| 5,344,105 | 9/1994 | Youhanaie | 244/3.14 |
| 5,507,452 | 4/1996 | Mayersak | 244/3.15 |
| 5,554,994 | 9/1996 | Schneider | 342/357 |
| 5,657,947 | 8/1997 | Mayersak | 244/3.19 |
| 5,739,786 | 4/1998 | Greenspan et al. | 342/357 |
| 5,775,636 | 7/1998 | Vig et al. | 244/3.24 |
| 5,786,790 | 7/1998 | Abbott | 342/357 |

*Primary Examiner*—Gregory C. Issing
*Attorney, Agent, or Firm*—Terry J. Anderson; Karl J. Hoch, Jr.

[57] ABSTRACT

A tail fin assembly for a munition having a housing configured for attachment to the munition, at least one flight control surface, an actuator for effecting movement of the flight control surface(s), so as to facilitate guiding of the munition, and a guidance system for controlling the actuator mechanism. The guidance system has a global positioning system (GPS) receiver for effecting control of the actuator mechanism.

19 Claims, 16 Drawing Sheets

GPS GUIDED MUNITION

RELATED APPLICATIONS

This patent application is a continuation-in-part patent application of U.S. Ser. No. 08/806,865, filed on Feb. 27, 1997 now U.S. Pat. No. 5,786,790 and entitled ON-THE-FLY ACCURACY ENHANCEMENT FOR CIVIL GPS RECEIVERS, the contents of which are hereby incorporated by reference.

FIELD OF THE INVENTION

The present invention relates generally to munitions, e.g., bombs and the like, and more particularly to a GPS guided munition which utilizes a low cost civilian GPS receiver in the munition itself so as to provide a cost effective weapons system. A differential GPS (DGPS) correction process is used to enhance the accuracy of the GPS guided munition. According to one preferred embodiment of the present invention, an aftermarket tail fin kit is provided so as to facilitate the simple and inexpensive conversion of existing unguided munitions into GPS guided munitions. An autonomously operated bomb control unit eliminates the need for expensive modifications to the aircraft.

BACKGROUND OF THE INVENTION

The use of air dropped munitions in warfare is well known. Such munitions typically comprise a generally tubular housing which is substantially filled with an explosive, a nose having an impact fuse and detonator for detonating the explosive, and fins for stabilizing the munition during its decent, such that it impacts the target with the nose thereof so as to assume proper detonation. The use of such air dropped munitions has provided a substantial advance in the art of warfare by facilitating the destruction of enemy targets while mitigating undesirable loss of life and/or destruction of military equipment.

However, as those skilled in the art will appreciate, conventional munitions must generally either be released with very high accuracy or in very large numbers in order to effectively destroy a desired target. Thus, it is frequently necessary to either drop such munitions from an undesirably low altitude or to fly an undesirably large number of sorties. Dropping conventional munitions from a lower than desirable altitude exposes the aircraft and crew to hazardous anti-aircraft artillery and ground-to-air missiles. The accuracy of such anti-aircraft artillery and ground-to-air missiles is substantially enhanced by the reduced range to target (altitude of the aircraft) provided by such low flight. For this reason low altitude bombing is extremely dangerous and is very rarely performed. Of course, flying an undesirably large number of sorties is expensive, time consuming, and exposes the aircraft and crew repeatedly to air defense weaponry such as anti-aircraft artillery and ground-to-air missiles.

Thus, in order to compensate for the lack of accuracy inherent when such conventional munitions are dropped from sufficient altitude so as to substantially mitigate the effectiveness of anti-aircraft artillery and/or ground launched missiles, a higher number of sorties must necessarily be flown. This is done in order to effect the delivery of a larger number of such conventional munitions to the target, thereby compensating for the reduced accuracy of such high altitude bombing and consequently enhancing the likelihood that the target will be destroyed.

In an attempt to overcome the deficiencies of conventional munitions in reliably destroying ground targets, particularly when dropped from a high altitude, smart munitions have been developed. Such smart munitions utilize a guidance and flight control system to maneuver the munition to the desired target. The guidance system provides a control signal to the control surfaces based upon the present position of a munition and the position of the target, so that the control surfaces maneuver the munition toward the target. Such guidance systems operate according to well known principles and typically utilize such technologies as laser guidance, infrared guidance and/or radar. Such guided munitions thus facilitate the reliable destruction of enemy targets by an aircraft flying at a sufficient altitude to substantially mitigate the effectiveness of anti-aircraft artillery and/or ground launch missiles and do so with a substantially reduced number of sorties.

It is also known to use the global positioning system (GPS) to guide various different munitions to intended targets. Multiple GPS satellite constellations are in the process of being implemented or are in the planning stage to provide accurate navigational information and position fixes for appropriate receivers or stations anywhere on the surface of the Earth. Among these GPS systems are the U.S. government-operated Navigation Satellite Timing and Ranging Global Positioning System, "NAVSTAR GPS", the "GLONASS" system planned by the government of the former Soviet Union, and two European systems known as "NAVSAT" and "GRANAS" presently under development. For ease of description, the following discussion and disclosure will focus specifically on the features of and use with the NAVSTAR GPS, although it will be understood that the invention has equal applicability to other global positioning systems.

The U.S. government-operated NAVSTAR GPS is designed to have four orbiting GPS satellites existing in each of six separate circular orbits to constitute a total of twenty-four GPS satellites, with twenty-one being operational and three serving as spares. The satellite orbits are neither polar nor equatorial but lie in mutually inclined planes and each satellite orbits the Earth approximately once every 12 hours, completing exactly two orbits while the Earth turns one revolution. With this arrangement at least four satellites come within the same field of view twenty-four hours a day all around the world. The position of each satellite at any given time is precisely known and navigation signals are continuously transmitted to the Earth providing position information indicating the position of the satellite in space with respect to time (GPS time). This position information is known as ephemeris data. In addition to the ephemeris data, the navigation signals transmitted by each satellite include an indication of the precise time at which the signal was transmitted. Consequently, the distance or range between a navigation signal receiver and a transmitting satellite may be determined using this time indication: by 1) noting the time at which the signal was received at the receiver, 2) calculating the propagation time delay, i.e., the difference between the time transmitted and time received, and 3) multiplying the delay by the speed of propagation of the signal. The result of this determination will yield a "pseudorange" from the transmitting satellite to the receiver. The range is called a "pseudorange" because inaccuracies may occur due to such factors as the receiver clock not being precisely synchronized to GPS time, and delays introduced into the navigation signal propagation times by its propagation through the atmosphere. These inaccuracies result, respectively, in a clock bias (error) and an atmospheric bias (error), with clock biases possibly as large as several milliseconds. In any event, using the two pieces of information in a navigation signal, i.e., the ephemeris data and the pseudorange, from at least four satellites, the position and time of a receiver with respect to the center of the Earth can be determined using passive triangulation techniques.

A more detailed discussion on the NAVSTAR GPS is found in an article by B. W. Parkinson and S. W. Gilbert, entitled, "NAVISTAR: Global Positioning System—Ten Years Later," Proceedings of the IEEE, Vol. 71, No. 10, October 1983, and in a text "GPS: A Guide to the Next Utility", published by Trimble Navigation Ltd., Sunnyvale, Calif., 1989, pp. 1–47, both of which are incorporated herein by reference.

The NAVSTAR GPS envisions two types of code modulation for the carrier wave propagating pseudorandom signals. In the first type, "Coarse/Acquisition" code, the carrier is modulated by a "C/A signal", and referred to as the C/A code and also as the "Standard Positioning Service" (SPS). The second type of modulation is commonly referred to as the "precise" or "protected" (P) code, and also as the "Precise Positioning Service" (PPS). An encrypted version of the P-code, i.e., Y code, is intended for use only by Earth receivers specifically authorized by the U.S. government so that Y-code sequences are kept secret and not made publicly available. This forces more NAVSTAR GPS users to rely solely on the data provided via C/A code modulation, which unfortunately results in a less accurate positioning system. Moreover, the U.S. government selectively corrupts the GPS data by introducing errors into the C/A code GPS signals being transmitted from the GPS satellites by changing the clock parameters, that is, the clock parameters for one or more satellites may be slightly or substantially modified, such as by the intentional dithering of the phase and frequency of the satellite clock, which practice is known as "selective availability" or simply SA. SA may be activated for a variety of reasons, e.g., the Department of Defense may activate it for national security. When SA is activated, the U.S. government is still able to use the NAVSTAR GPS because it has access to the means of compensation to remove SA effects. The uncompensated C/A code data, however, may be rendered substantially less accurate, i.e., degraded. In view of the foregoing distinction, C/A code modulation receivers are referred to as "civil or civilian" receivers or sets, and Y-code modulation receivers are referred to as military receivers or sets. For purposes of generality, reference to a "civil" receiver herein will indicate a varying or degraded accuracy GPS receiver or set, and to a "military" receiver will indicate a precise accuracy GPS receiver or set.

In many applications of GPS, it is desirably to use a civil GPS receiver, such as in a mobile or expendable vehicle, to reduce cost and complexity, even though the user has access to the crypto keys that afford Precise Positioning Service (PPS) accuracy. This is especially true in expendable vehicles or weapons for launching from some form of launch vehicle. If the user is authorized for PPS, he may have a military GPS receiver on the launch vehicle that is much more accurate than the civil set in the expendable one.

A Differential GPS (DGPS) correction process is available for high-accuracy civil GPS applications, that uses fixed surveyed antenna coordinates and requires the corrections to come from a ground station almost in real time. Typical civil GPS receivers have inherent accuracy limitations, largely due to the aforementioned intentional degradation introduced into the signals by the U.S. Department of Defense, which limitations can be removed by the DGPS process. Civil GPS receiver accuracy, which as noted above is commonly referred to as Standard Positioning Service or SPS, without differential correction is specified to be better than 100 meters. While some of the accuracy limitation is due to the use of only one frequency, which prevents the measurement of errors due to the Ionosphere delays, and the use of the Coarse/Acquisition (C/A) code instead of the more accurate Precision P(Y) code, the primary contributor to the accuracy limitation is the intentional dithering of the phase and frequency of the satellite clock, i.e., SA. A military set removes the SA errors with an algorithm that uses data which is only available to authorized users through the use of crypto keys. In addition, the user of a militarized receiver can track a second frequency which allows the measurement of and compensation for the Ionosphere delays.

Although such guided munitions are very accurate and thus, extremely effective in destroying enemy targets upon the ground when dropped from high altitude, they do possess the inherent deficiency of being extremely expensive. Not only is the guided munition itself substantially more expensive than conventional, i.e., non-guided, munitions, but the aircraft delivering the munition must undergo extensive and very expensive modifications in order to accommodate the guided munition. Typically, additional avionics and control equipment is required in the cockpit, wiring must be provided from the cockpit to the bomb mount or pylon, and a weapon specific electrical and mechanical interface to the guided munition must be provided. Because they are expensive, such guided munitions are typically reserved for use only against targets having a very high strategic value.

In view of the foregoing it would be desirable to provide a munitions, e.g., an air dropped munitions, having enhanced accuracy with respect to conventional munitions, but being far less expensive than guided munitions.

SUMMARY OF THE INVENTION

The present invention specifically addresses and alleviates the above mentioned deficiencies associated with the prior art. More particularly, the present invention comprises a tail fin assembly for a munition such as a bomb. As used herein, the term munition is defined to include bombs, missiles, artillary shells, and the like. The tail fin assembly comprises a housing configured for attachment to the munition, at least one flight control surface, an actuator mechanism for effecting movement of the flight control surface(s) so as to facilitate guidance of the munition and a guidance system for controlling the actuator mechanism. The guidance system comprises a global positioning system (GPS) receiver for effecting control of the actuator mechanism.

According to the preferred embodiment of the present invention, the guidance system comprises a civilian GPS receiver. The tail fin assembly further comprises a radio receiver for receiving control signals from an airplane. Preferably, the flight control surfaces comprise at least three fins, preferably four fins.

Moreover, the present invention comprises a weapons system comprising an airplane. A munition releasibly attached to the airplane, wherein the munition comprises an actuator mechanism and a guidance system as discussed above, and a bomb control unit in communication with the munition for providing the munition with guidance information which enhances the accuracy of the GPS system of the munition.

The bomb control unit comprises a GPS receiver having greater accuracy than the GPS receiver of the munition. According to one preferred embodiment of the present invention the bomb control unit comprises a military GPS receiver and the munition comprises a civilian GPS receiver. According to an alternative configuration of the present invention the bomb control unit comprises both a military and a civilian GPS receiver and the munition comprises only a civilian GPS receiver.

If the bomb control unit comprises only a military GPS receiver, then the accuracy of the GPS guided munition is enhanced by providing more accurate position information to the GPS guided munition from the military GPS receiver at the time of release, thereby enhancing the accuracy of the guidance system thereof.

If the bomb control unit comprises both a military and a civilian GPS receiver then offsets or error signals are generated which reflect the difference between the positions indicated by the military and the civilian GPS receivers and these offsets are then transmitted to the GPS guided munition so as to enhance the accuracy thereof.

Alternatively, if the bomb control unit contains only a military GPS receiver, then such offsets may optionally be generated with respect to the civilian GPS receiver of the GPS guided munition and these offsets then provided to the GPS guided munition by the bomb control unit.

The GPS guided munition of the present invention may be embodied as either a tail fin kit to be used as an after market add-on to existing munitions, such as the MK82 500 pound bomb. Alternatively, the GPS guided munition of the present invention may comprise a bomb or other munition having the GPS guidance system and flight control system of the present invention integrally formed therewith.

As those skilled in the art will appreciate, when the GPS guided munition of the present invention is embodied as a tail fin kit, then the original tail fin of the munition, such as that of the MK82 500 pound bomb must be removed and replaced with the tail fin kit of the present invention.

The bomb control unit comprises a radio transmitter and the munition comprises a radio receiver such that the bomb control unit can transmit control and guidance information to the GPS guided munition without requiring modification, i.e., expensive wiring, etc., to the aircraft. Optionally, the GPS guided munition comprises a radio transmitter for transmitting information such as a ready signal from the GPS guided munition to the bomb control unit. In this instance, the bomb control unit must, of course, comprise a receiver for receiving such information.

Further, according to the preferred embodiment of the present invention, the bomb control unit comprises a totally autonomous device, which does not require power or any other connection to the aircraft, this further facilitates use of the GPS guided munition of the present invention without modification of the aircraft. Thus, the GPS guided munition of the present invention may be utilized with various different existing aircraft merely by loading the munition onto a mechanically compatible pylon or bomb release mechanism and by providing the pilot or another crew member with the bomb control unit, which is preferably strapped to the crew members leg. Thus, no electrical or mechanical modification of the aircraft is necessary.

According to the preferred embodiment of the present invention, the GPS guided munition further comprises an inertial guidance system, comprising at least a roll rate gyroscope for sensing changes in the roll attitude of the GPS guided munition, so as to facilitate proper flight control thereof.

According to an alterative configuration of the GPS guided munition of the present invention, the GPS guided munition comprises two antennae for the civilian GPS receiver of the GPS guided munition. One antenna is disposed upon each of two different fins of the GPS guided munition and a switching circuit alternates connection of the GPS receiver to each of the two antenna sequentially. Thus, the use of two antennae facilitates determination of the roll attitude of the munition, thereby obviating the need for a roll rate gyroscope.

These, as well as other advantages of the present invention will be more apparent from the following description and drawings. It is understood that these changes and the specific structure shown and described may be made within the scope of the claims without departing from the spirit of the invention.

DETAILED DESCRIPTION OF THE PREFERRED INVENTION

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions may be accomplished by different embodiments that are also intended to be encompassed within the spirit and scope of the invention.

According to the preferred embodiment of the present invention a tail kit containing a civilian GPS receiver facilitates maneuvering of the munitions after release. The accuracy of a GPS guided munition (having a civilian GPS receiver) is enhanced by providing position updates and/or an error signal from a military GPS receiver disposed within the aircraft. The military GPS receiver is preferably disposed within the bomb control unit, which is preferably strapped to a crew member's leg, so as to mitigate the need for costly aircraft modifications.

Figure 1:
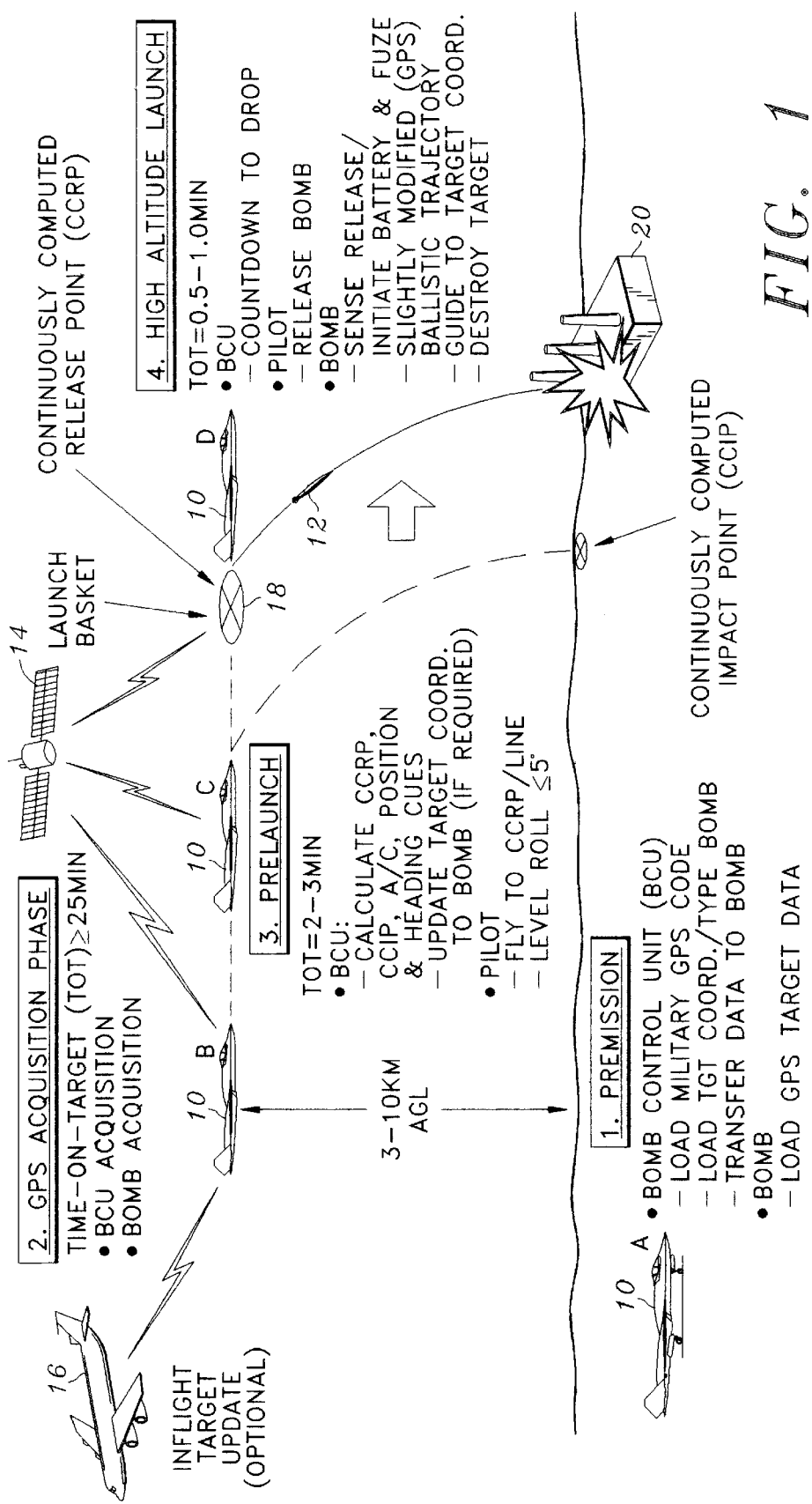
FIG. 1 shows a munition being dropped by an aircraft upon a target wherein the position of the aircraft is continuously updated via a military GPS receiver and the position of the munition is continuously updated via the miliary GPS receiver of the aircraft until launch, and is thereafter updated via a civilian GPS receiver contained therein.

The GPS guided munitions of the present invention is illustrated in FIGS. 1–17, which depict a presently preferred embodiment thereof. Referring know to FIG. 1, an aircraft 10 having a bomb control unit (BCU, shown in FIG. 3) according to the present invention disposed within the cockpit thereof, and carrying at least one GPS guided munitions, is shown at four different positions A, B, C, and D associated with a bombing mission. The aircraft 10 at position A is shown during permission wherein the appropriate military GPS code is loaded into the bomb control unit.

As those skilled in the art will appreciate, an encryption key must be provided so that a military GPS receiver will function properly. The target coordinates and bomb type are also typically loaded into the BCU during permission. The target coordinates may be transferred from the bomb control unit to the bomb at this time, if desired. Alternatively, the target coordinates may be loaded directly into the munitions, typically via a personal computer.

The aircraft 10 at position B is in the GPS acquisition phase wherein it receives military accuracy GPS data so as to precisely define the position thereof. This typically occurs at a time-on-target (TOT) of greater than or equal to 25 minutes. At this time both the military GPS receiver within the aircraft 10 and the civilian GPS receiver within the GPS guided munitions 12 receive position updates from the GPS satellites 14 (only one GPS satellite is shown in FIG. 1 for clarity).

The aircraft 10 at position C is in a pre-launch mode which typically occurs approximately 2–3 minutes prior to munitions release. At this time, the bomb control unit calculates the CCRP (continuously calculated release point), CCIP (continuously computed impact point), and the aircraft positioned and heading cues. The target coordinates are updated, if necessary.

During pre-launch, the pilot is required to fly to CCRP/ line and to maintain level flight, i.e., roll less than or equal to 5 degrees.

It is desirable to minimize roll since the roll attitude of the aircraft 10 at the time of release substantially affects the roll attitude of the GPS guided munition 12 being released and since the roll attitude of the GPS guided munition 12 released substantially affects the accuracy thereof.

The accuracy of the GPS guided munitions 12 is affected by roll since different flight control surfaces thereof must be utilized to guide the GPS guided munitions 12 toward the target, depending upon the roll attitude of the GPS guided munitions 12. That is, different fins will typically be utilized to effect a right turn of the GPS guided munitions 12 when the GPS guided munitions 12 is in a first roll attitude, from the fins which are utilized when the GPS guided munitions 12 is in a second roll attitude. Although the roll attitude of the GPS guided munitions 12 is monitored by a rudimentary inertial guidance system, preferably comprising a roll rate gyroscope, those skilled in the art will appreciate that the use of such inertial guidance system introduces additional undesirable errors. Thus, in order to minimize such additional errors, it is desirable to maintain the aircraft 10 in a generally level attitude at the time of launch. In this manner, the guidance system of the GPS guided munitions 12 is less dependant upon the roll rate gyroscope for the accurate guidance thereof.

At the launch basket 18 one or more GPS guided munitions 12 are released from the aircraft 10. Because of the additional accuracy provided by the GPS guidance of the munitions 12, the GPS guided munitions 12 may be released at a much higher altitude, while maintaining a desired accuracy thereof. Such a high altitude release of the GPS guided munitions 12 affords substantially enhanced safety for the crew and aircraft 10, thereby substantially enhancing mission survivability.

According to the preferred embodiment of the present invention, the accuracy of the munitions is substantially enhanced without greatly increasing the cost thereof. This is accomplished by utilizing a civilian GPS receiver (74 of FIG. 6) and the GPS guided munition 12. As those skilled in the art will appreciate, a civilian GPS receiver is substantially less expensive than a military GPS receiver. Thus, although a military GPS receiver would provide enhanced accuracy for the GPS guided munition, sufficient accuracy is obtained via the use of a civilian GPS receiver according to the methodology of the present invention wherein the accuracy of the civilian GPS receiver is substantially enhanced by maintaining communication with a military GPS receiver in the bomb control unit 24, as discussed in detail below.

Thus, the use of such GPS guided munitions 12 provides a desirable compromise between the use of inaccurate unguided gravity munitions, i.e., bombs, and expensive guided munitions such as laser guided smart bombs. As those skilled in the art will appreciate, the use of unguided bombs inherently involves a larger number of bombs, typically requiring a greater number of sorties, to assure destruction of the target. The use of unguided munitions may also require substantially more dangers low altitude release thereof, so as to assure destruction of the target.

The use of guided munitions such as smart bomb is extremely costly, and is typically therefor reserved for use against only the most strategic targets.

The present invention provides a desirable compromise between cost and effectiveness. According to the present invention, low cost modifications to the munitions and the use of a bomb control unit which does not require modification of the aircraft provide enhanced accuracy for the munitions, such that the number of sorties required to effectively destroy a desired target is substantially reduced.

According to the preferred embodiment of the present invention, a continuously computed impact point (CCIP) is provided during the pre-launch phase. When the continuously computed impact point coincides with the target, then the desired GPS guided munitions are released. In this manner, the ballistic trajectory of the GPS guided munitions 12 is such that minimal correction is required for the GPS guidance system of the munitions 12 to assure an accurate impact upon the target.

According to the preferred embodiment of the present invention, the GPS guided munitions 12 are released manually, i.e., via the actuation of a pickle switch, so as to mitigate the requirement for expensive modifications to the aircraft. However, as those skilled in the art will appreciate, the GPS guided munitions 12 may also be released automatically by providing electrical communication between the electro-mechanical bomb release mechanism of the aircraft and the bomb control unit 24. If desired.

The time on target (TOT) for such a high altitude launch is typically 0.5–1.0 minutes. According to the preferred embodiment of the present invention, the bomb control unit provides a countdown to release. As mentioned above, the munitions may either be manually released, by a crew member, or, alternatively, may automatically be released by the bomb control unit when the continuously computed impact point (CCIP) coincides with the target.

Once released, the GPS guidance system of the munitions 12 guides the munitions 12 toward the target 20. Thus, the accuracy or timing of the release, wind conditions, etc. are not as likely to cause the GPS guided munitions 12 of the present invention to impact off target as would be the case for a non-guided munitions.

At this time the aircraft 10 may optionally receive an in flight target update, either from a ground based transmitter (not shown) or from another aircraft 16. Such an in flight target update may either be transmitted to a crew member, who then transmits the target update to the GPS guided munitions via the bomb control unit, or optionally may be transmitted from the ground based transmitter or aircraft 16 directly to GPS guided munitions. As those skilled in the art will appreciate, various different encryptions and/or authentication methodologies may be used to verify the authority of the transmitter to change the target coordinates of the GPS guided munitions. Of course, more than one GPS guided munition of the present invention may be carried upon a single aircraft. In this instance, a single bomb control unit is preferably utilized to provide an interface to each of the GPS guided munitions. However two or more different bomb control units may optionally be utilized, as desired.

Figure 2:
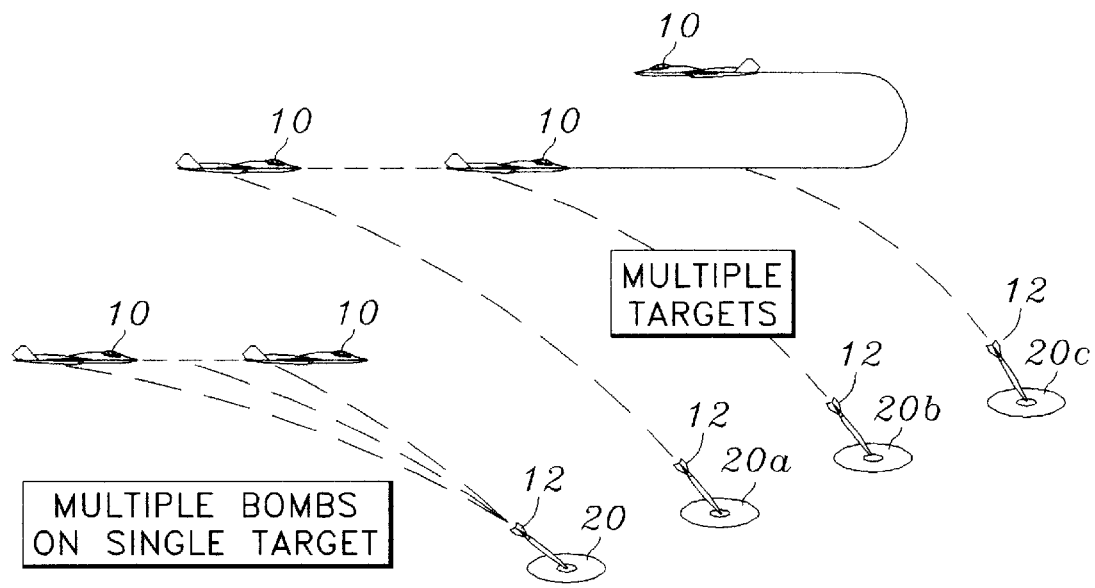
FIG. 2 shows a single plane dropping multiple munitions upon a single target and also shows a single plane dropping single munitions upon multiple targets.

Referring now to FIG. 2, the release of multiple GPS guided munitions 12 against a single target 20 by a single aircraft 10 and the release of multiple GPS guided munitions 12 against multiple targets 20a–20c by a single aircraft 10 are shown. The use of GPS guided munitions according to the present invention facilitate the accurate bombing of a single target 20 by a plurality of GPS guided munitions 12 released from a single aircraft 10. Since the GPS guidance system of the GPS guided munitions 12 corrects for errors in the ballistic trajectory of the munitions 12 introduced by release thereof at different times corresponding to different continuously computed impact points (CCIP's) accuracy of the GPS munitions is enhanced.

The GPS guided munition of the present invention also facilitates the accurate bombing of multiple targets during a single pass or munitions run. As those skilled in the art will appreciate, when multiple, closely spaced targets are to be bombed, it is typically necessary to make multiple passes so as to afford the time necessary to accurately individually release the munitions. However, when the GPS guided munitions of the present invention is utilized, then the accuracy with which the munitions is released is substantially less crucial because the GPS guidance system compensate for such errors. Thus, a plurality of such GPS guided munitions 12 may be released such that the separate GPS guided munitions 12 are individually guided to their respective targets 20a–20c. This reduces the number of bomb runs necessary for the destruction of multiple closely spaced targets, thereby substantially enhancing the survivability of the crew and aircraft.

Figure 3:
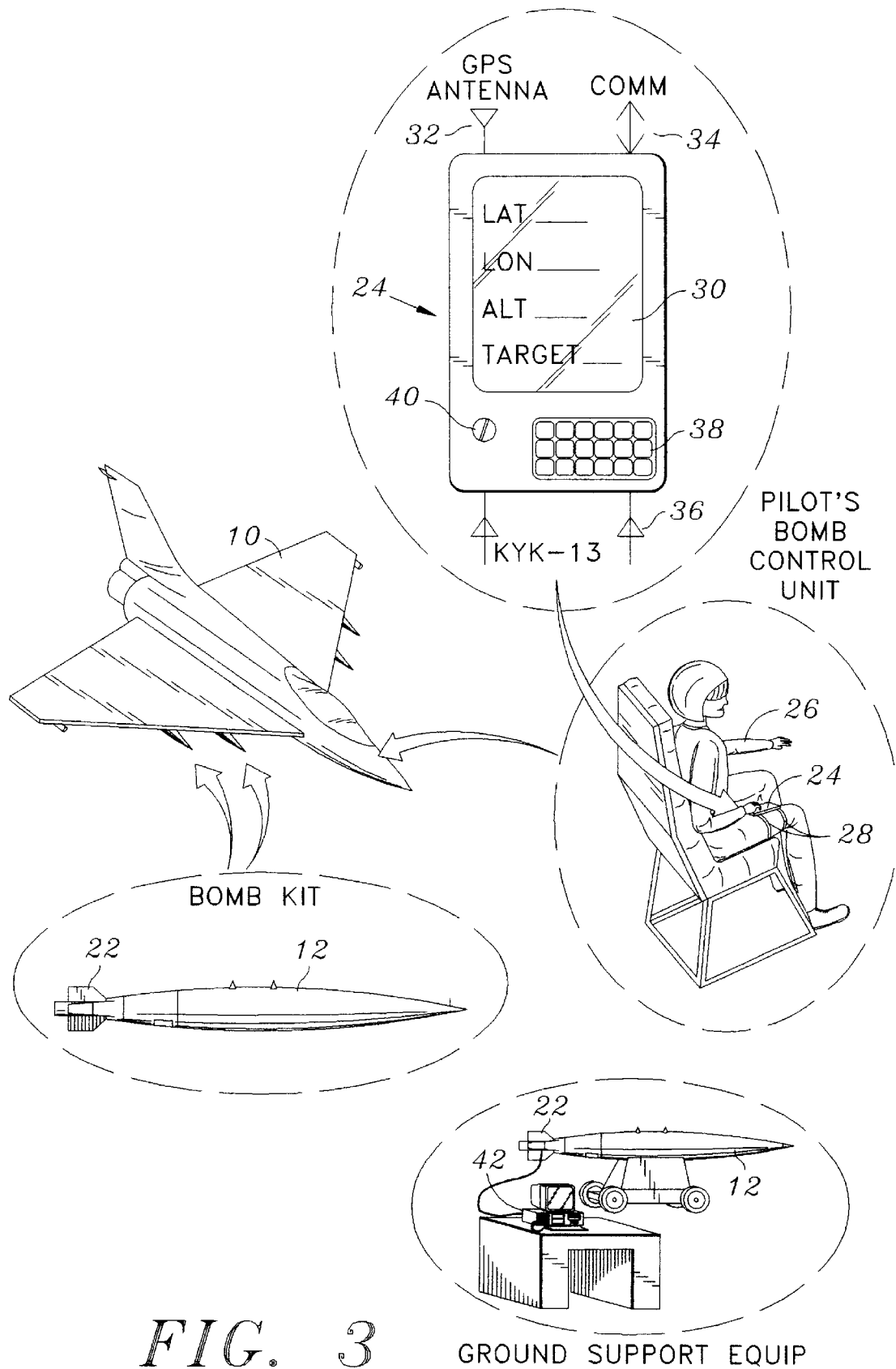
FIG. 3 shows an aircraft having GPS guided munitions installed thereon, wherein the munitions comprise a tail fin kit according to the present invention, and also showing an autonomous bomb control unit strapped to a crew members leg.

Referring now to FIG. 3, the GPS guided munitions preferably comprises a bomb having a tail fin kit 22 installed thereon. According to the preferred embodiment of the present invention, the tail fin kit is specifically designed for attachment to a MK82/EU2 500 pound bomb. As those skilled in the art will appreciated, the MK82/EU2 is a standard munition, and in common use throughout a substantial portion of the world. Thus, the tail fin kit 22 of the present invention provides a low cost, easy to use means for converting a standard 500 pound bomb into a comparatively accurate weapon.

The BCU 24 comprises a portable, autonomous device which is preferably attached to a crew member such as pilot 26 via straps 28, preferably to one leg thereof. Thus, the bomb control unit 24 is positioned for easy reading of the display 30 thereof and for easy use thereof.

The bomb control unit 24 comprises a GPS antenna 32 for facilitating accurate position updates to the GPS guided munition 12 via the built in military GPS receiver thereof. The bomb control unit 24 also comprises a communications link 34 with the GPS guided munitions(s) so as to facilitate enhancement of the guidance system thereof, which comprises a civilian GPS receiver, and also facilitates control thereof, e.g., release thereof.

A key pad 38 facilitates the entry of target coordinates, control codes, etc. Optionally, the bomb control unit 24 further comprises a KYK-13 input 36 to facilitate the entry of the encryption key necessary for use of the military GPS receiver. A munitions I.D. switch 40 preferably comprises a selector switch for selecting which of plural munitions loaded upon the aircraft 10 are to be communicated with at a particular time. Thus, the pilot 26 simply sets the munitions I.D. selector 40 to the desired GPS guided munition 12 and enters the target coordinates thereinto, for example.

A personal computer 42 is preferably utilized to test the tail fin kit 22, while the GPS guided munitions 12 is on the ground. The personal computer 42 may also be utilized to upload target coordinates to the guidance system of the tail fin kit 22, if desired.

Figure 4:
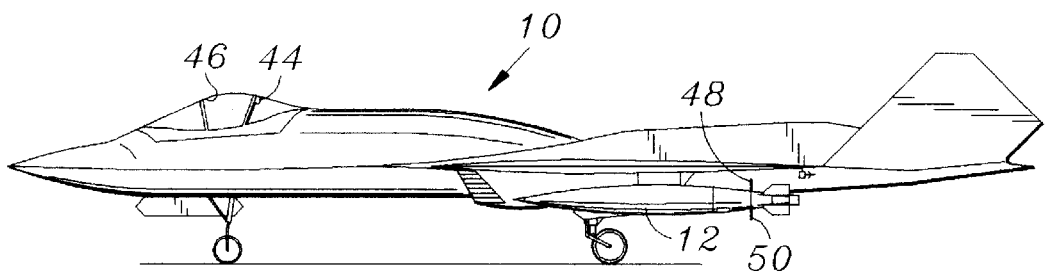
FIG. 4 is a side view of an aircraft showing a GPS guided munition, i.e., bomb, according to the preferred embodiment of the present invention loaded thereon.

Referring now to FIG. 4, the aircraft 10 has a GPS antenna 44 which may either be a part of the bomb control unit 24, or is separate therefrom and is mechanically attached to a portion of the aircraft 10 and connected to the bomb control unit 24 via a wire. A bomb control unit radio frequency link antenna 46 may similarly either be a part of the bomb control unit 24 itself or be attached to the aircraft 10 and then connected via a wire to the bomb control unit 24.

The GPS guided munition 12 likewise comprises a GPS antenna 48 and a bomb control unit RF link antenna 50. The GPS antenna 44 of the bomb control unit facilitates operation of the military and civilian receivers thereon. GPS receiver thereof and the GPS antenna 48 of the GPS guided munition 12 facilitates operation of the civilian GPS receiver thereof. The bomb control unit radio frequency link antenna 46 of the aircraft 10 and the munition unit RF link antenna 50 of the GPS guided munition 12 facilitates communication of the bomb control unit 24 with the GPS guided munition 12.

According to one preferred configuration of the present invention, the bomb control unit comprises both a military GPS receiver and a civilian GPS receiver, each of which shares a common GPS antenna such that the difference or error between the military and civilian GPS receivers can easily be computed and then transmitted to the GPS guided munition 12. In an alternative configuration of the present invention, only a military GPS receiver is contained within the bomb control unit 24 and the error is calculated between that military GPS receiver and the civilian GPS receiver of the GPS guided munition 12.

Figure 5:
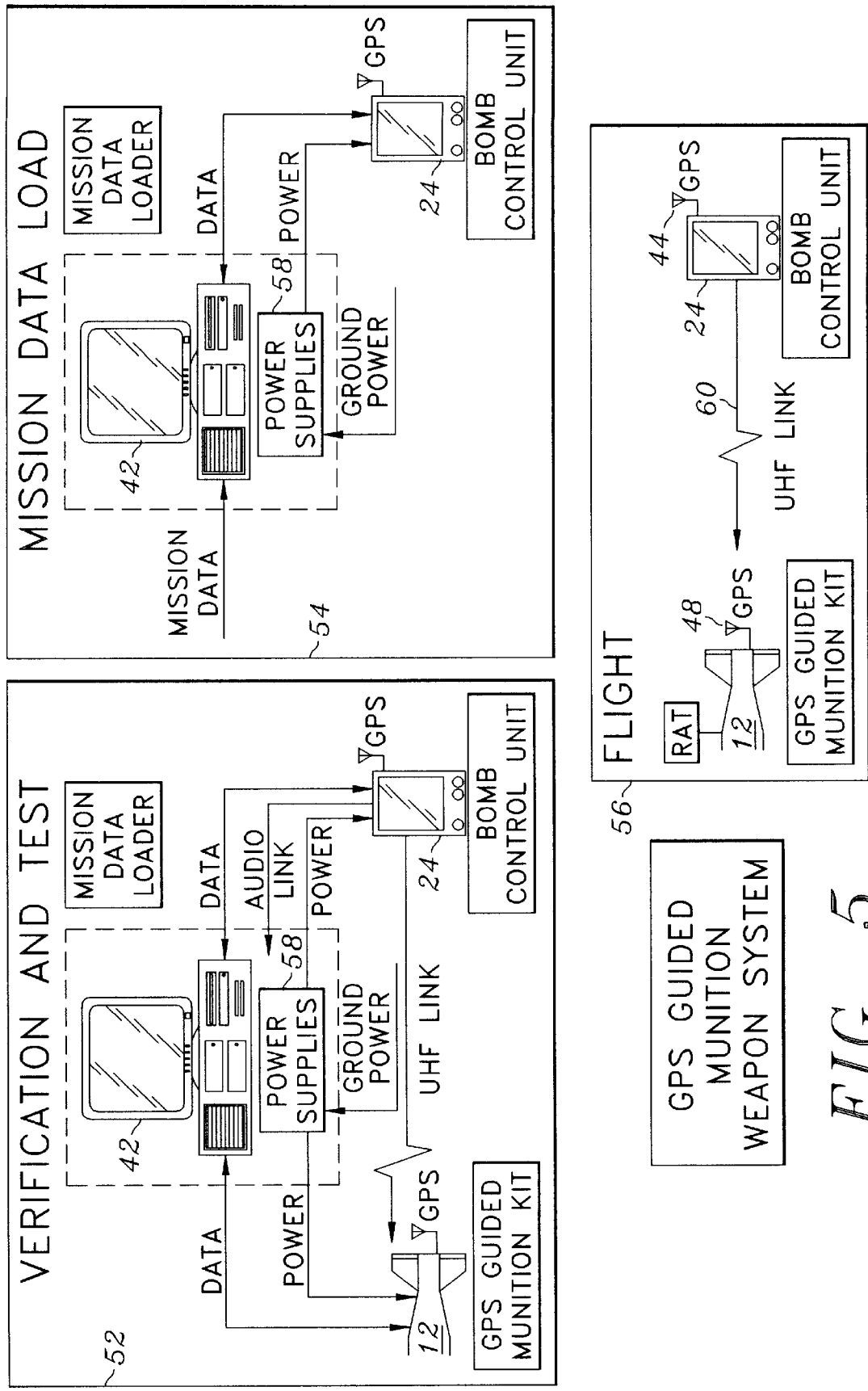
FIG. 5 is a schematic diagram showing verification and test, mission data load, and flight of a GPS guided munition, according to the present invention.

Referring now to FIG. 5, the verification and test 52, mission data load 54, and flight 56 functions of the GPS guided munition 12 are shown in further detail. The verification and test function 52 comprises providing power from power supplies 58 to the GPS guided munitions 12 and providing targeting and/or control signals to the GPS guided munition 12 from personal computer 42. The bomb control unit 24 is in communication with the personal computer 42, providing an audio link from the bomb control unit 24 to the personal computer 42 for verifying proper operation of the audio output of the bomb control unit 24. The audio link preferably provides an audible tone to indicate various conditions to the crew member 26 such as the initiation of continuously computed impact point (CCIP), weapon release, and simulated weapon impact during testing. The audio link is typically used to indicate to the pilot when it is necessary to fly steady and level, just prior to release, so as to effect calibration of the roll rate gyro and also to minimize roll of the GPS guided munition upon release thereon.

During the mission data load 54, the personal computer 42, having previously received mission data via either keyboard entry or from a floppy disk, network, etc. facilitates loading of the mission data to the bomb control unit 24. Optionally, the personal computer 42 may upload mission data directly to the GPS guided munition 12.

During the flight function 56 the GPS guided munition 12 receives civilian GPS position data via GPS antenna 48 which provides the GPS signal to the civilian GPS receiver within the GPS guided munition 12 and also receives a radio signal, preferably a UHF radio signal 60 from the bomb control unit 24.

Figure 6:
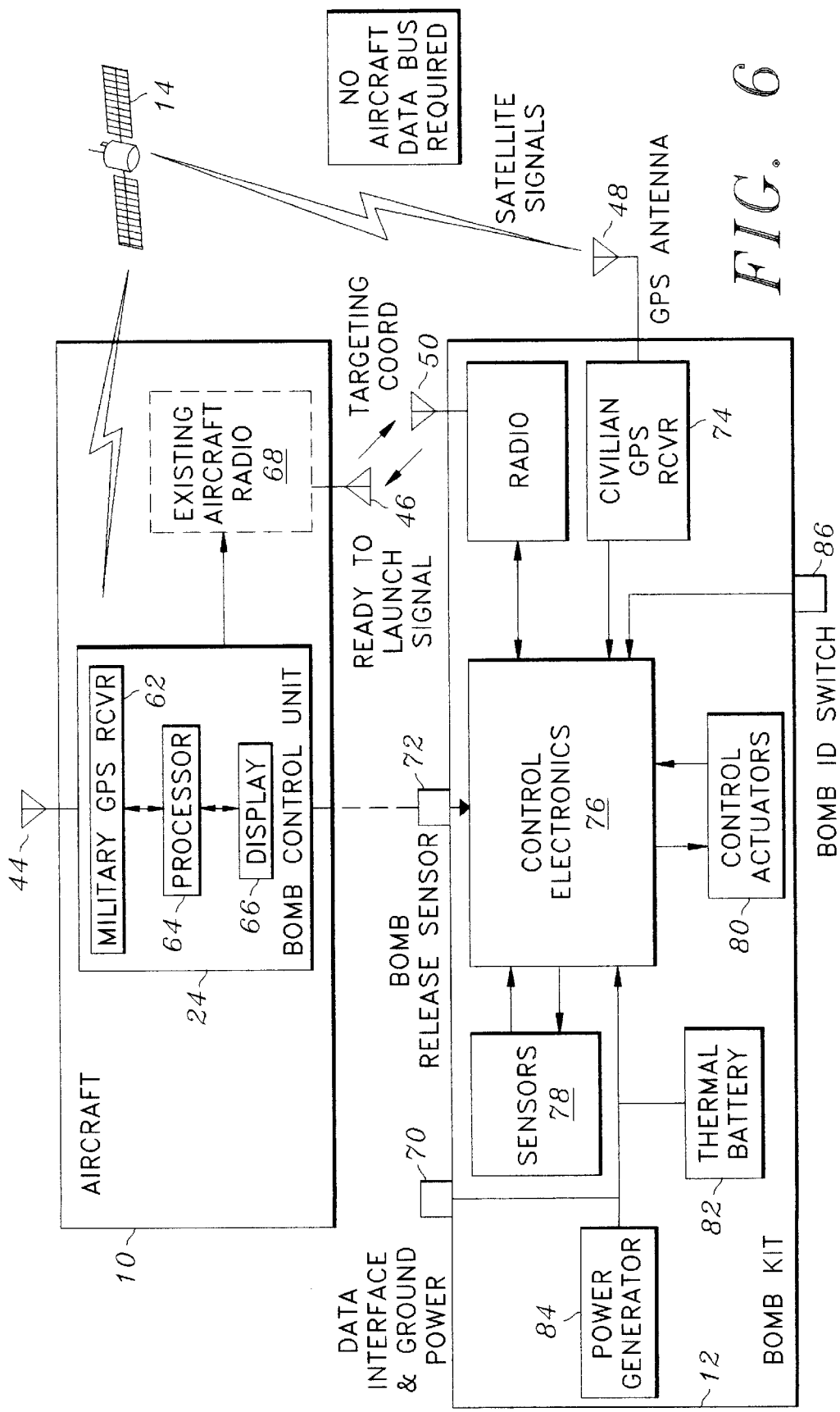
FIG. 6 is a block diagram showing the interaction of the bomb control unit disposed within the aircraft with the tail fin kit of the GPS guided munition.

Referring now to FIG. 6, the bomb control unit 24, typically disposed aboard the aircraft 10, comprises a GPS antenna 44 in electrical communication with a military GPS receiver 62. The military GPS receiver 62 is in communication with a processor 64 which processes the output of the military GPS receiver 62 for display 66. The bomb control unit 24 is optionally in communication with the existing aircraft radio 68 which may optionally be utilized to facilitate the communication of targeting coordinates to the GPS guided munitions and the communication of a ready to launch signal from the GPS guided munition 12 to the bomb control unit 24. Alternatively, the bomb control unit 24 contains an autonomously operated radio.

The GPS guided munition 12 comprises a data interface and ground power port 70 to facilitate testing and the optional uploading of target coordinates thereto on the ground.

A munition release sensor 72 provides an indication to the crew that the GPS guided munition 12 has been released from the aircraft. GPS antenna 48 receives a GPS signal from satellite 14 and provides the GPS signal to civilian GPS receiver 74. The civilian GPS receiver 74 provides an output to control electronics 76 which is in electrical communication with sensors 78, e.g., an inertial guidance sensors such as a roll rate gyroscope. The control electronics 76 is also in electrical communication with control actuators 80 for effecting movement of the flight control surfaces, e.g., fins, so as to facilitate maneuvering, of the GPS guided munition 12 towards the target.

Thermal battery 82 and/or power generator 84, e.g., ram turbine provide electrical power to the GPS guided munition 12.

A munition ID switch 86 preferably located externally upon the GPS guided munition determines the radio communication channel between that particular GPS guided munition 12 and the bomb control unit 10, such that the bomb control unit 10 may be utilized with a plurality of different GPS guided munitions 12 upon the same plane and also such that bomb control units of different planes do not interfere each others munitions.

Figure 7:
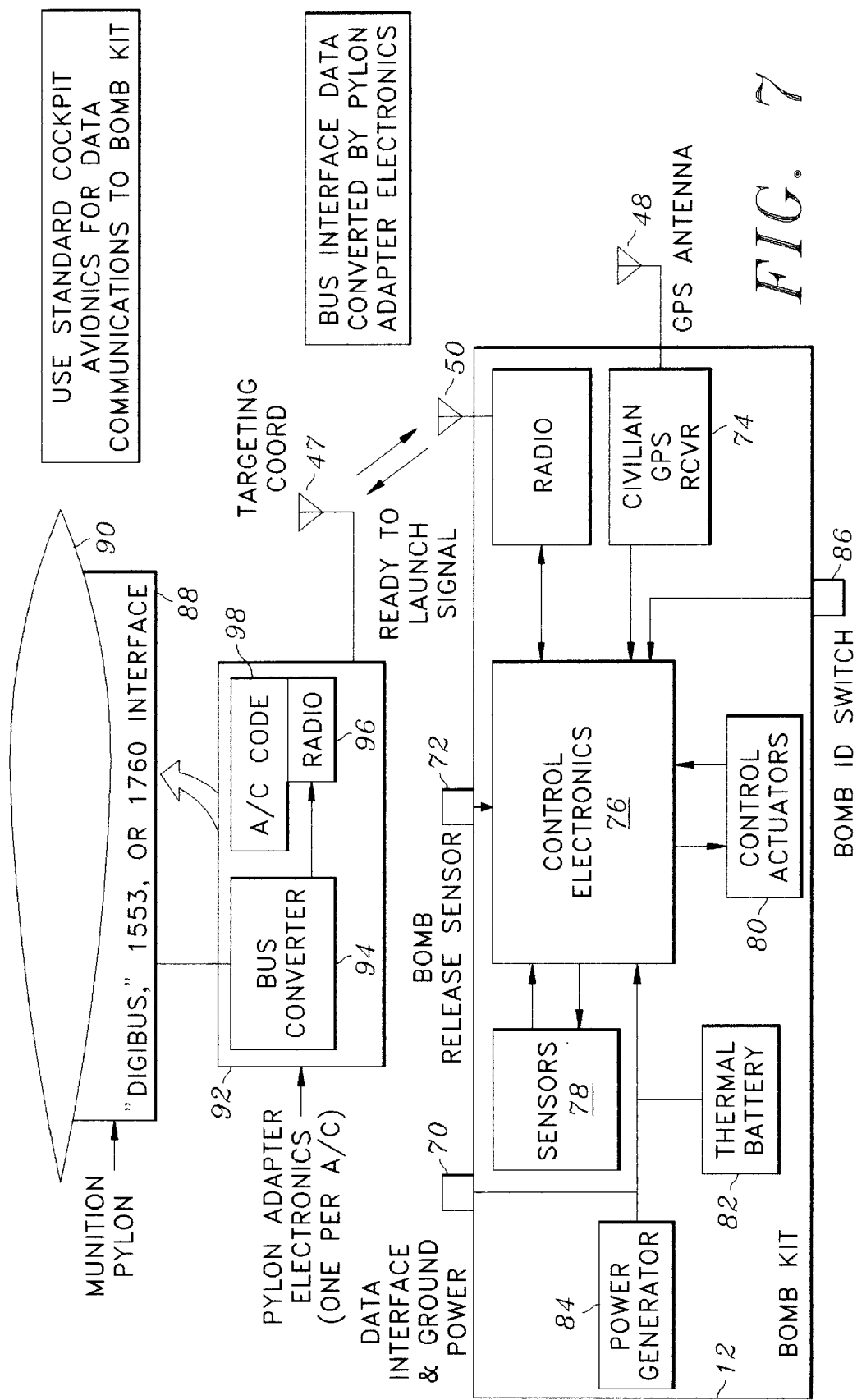
FIG. 7 is a block diagram showing the compatibility of the GPS guided munitions of the present invention with a bus-equipped aircraft.

It is important to note that the design shown in FIG. 6 does not require an aircraft data bus. However, if an aircraft data bus is available, then the configuration of FIG. 7 may alternatively be utilized. As shown in FIG. 7, a munition pylon 88 depends downwardly from the aircraft wing 90. A DIGIBUS 1553 or 1760 interface is included in the munition pylon 88. In this case a pylon adaptor 92 comprises a bus converter 94 and a radio 96 which utilizes an aircraft code 98 to uniquely identify the munition to the aircraft. As before, a radio antenna 47 provides electrical communication between the aircraft 10 and the GPS guided munition 12.

Figure 8:
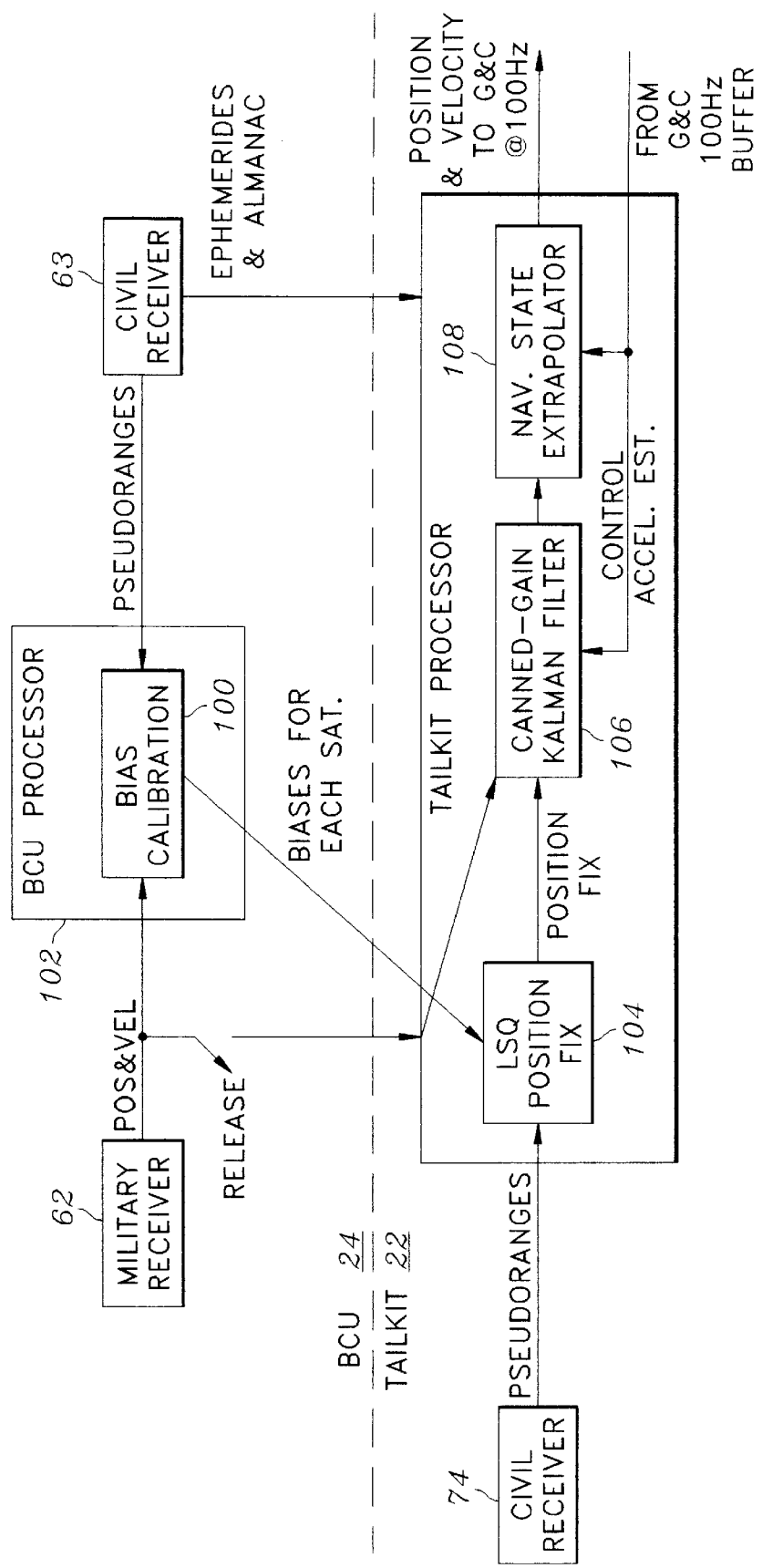
FIG. 8 is a block diagram showing the navigation system of the GPS guided munitions of the present invention.

Referring now to FIG. 8, the military GPS receiver 62 of the bomb control unit 24 provides position and velocity outputs to a bias calibration circuit 100 of the bomb control unit processor 102. As discussed above, according to one preferred embodiment of the present invention, the bomb control unit 24 also comprises a civilian GPS receiver 63 which provides pseudo ranges to the bias calibration circuit 100 of the bomb control unit process 102. The bias calibration circuit 100 then provides biases or error signals to the least squares (LSQ) position fix circuit 104 of the tail kit 22 so as to enhance the accuracy of GPS guidance of the GPS guided munition 12. Position and velocity information from the military GPS receiver 62 may optionally be provided directly from the military receiver 62 to canned-gain Kalman filter 106, so as to enhance the filtering capability thereof and thereby provide enhanced accuracy after release of the GPS guided munition 12. Navigation state extrapolator 108 provides position and velocity information to the guidance and control system.

Optionally, a control accelerometer estimate is provided from a inertial guidance system so as to aid in navigation state extrapolation and filtering.

Figure 9:
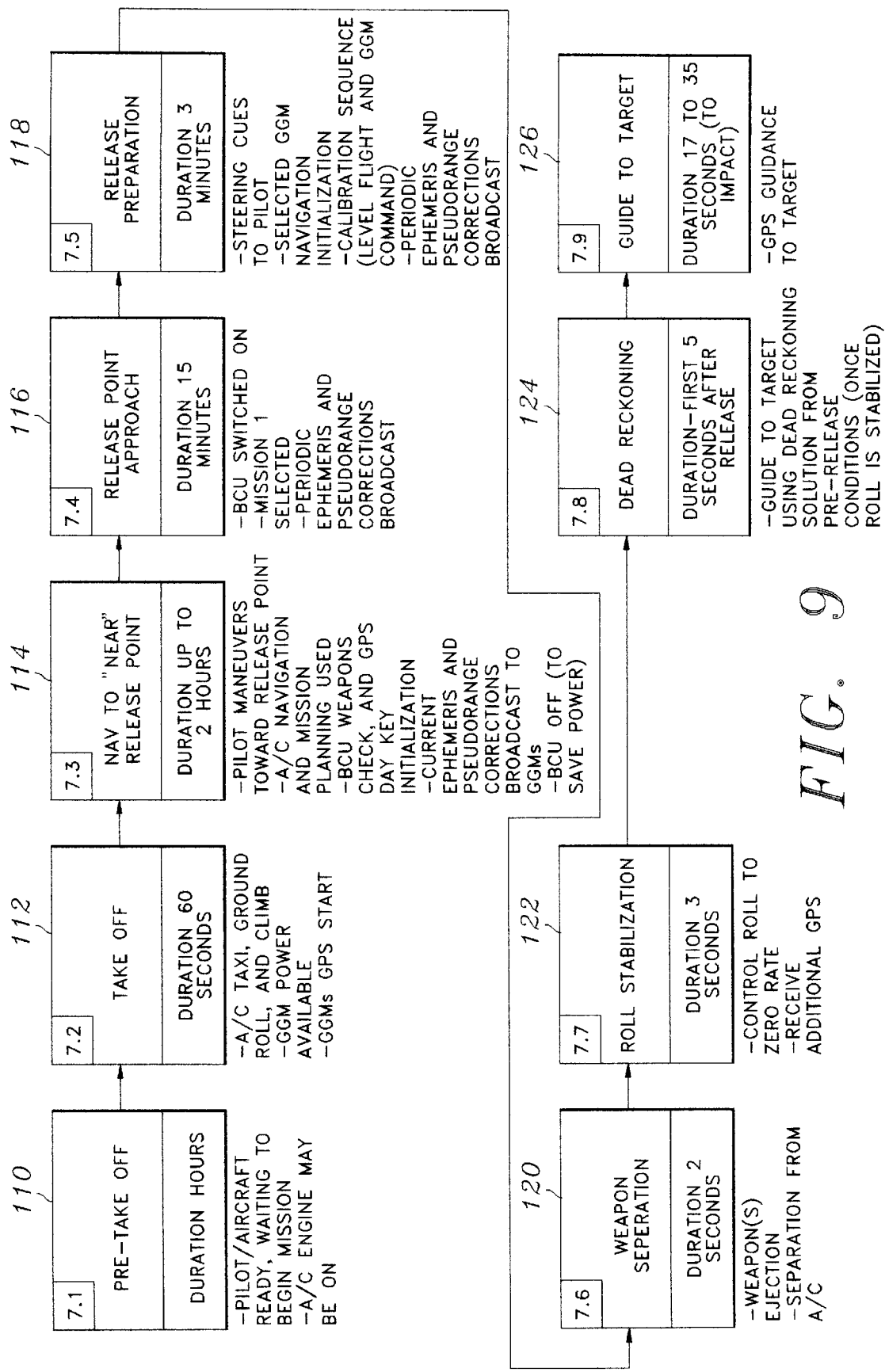
FIG. 9 is a flow chart showing the steps involved in a typical mission utilizing a GPS guided munitions according to the present invention.

Referring now to FIG. 9, a typical sortie or bombing mission wherein the GPS guided munition of the present invention as utilized generally comprises the steps of pre take-off 110, take off 112, navigation to near release point 114, release point approach 116, release preparation 118, weapon separation 120, roll stabilization 122, dead reckoning 124, and guide to target 126. Pre-take off 110 typically lasts for several hours. During pre-take off 110 the pilot and aircraft are made ready and typically wait for the mission to begin. During this time the aircraft engine may optionally be running.

Take off 112 generally lasts approximately 60 seconds. During take off 112 the air craft taxies, typically performs a ground roll, and climbs to altitude. Power for the GPS guided munition is typically available at take off and the civilian GPS receiver is functional at this time.

Navigation to near release point 114 typically takes up to two hours. During this time the pilot maneuvers toward the release point. Aircraft navigation and mission planning is used to facilitate maneuvering of the aircraft toward the release point. A bomb control unit weapons check and GPS day key initialization are typically performed during this time. Current ephemeris and pseudorange corrections are broadcast to the GPS guided munition. Optionally, bomb control unit power can be turned off when the bomb control unit is not being used, so as to conserve power. The bomb control unit is typically totally autonomous and thus operated from battery power. Alternatively, the bomb control unit may be powered from the aircraft. Of course, the bomb control unit must be turned on during release point approach 116, so as to facilitate enhancement of the accuracy with which the GPS guided munition's 12 guidance system operates, as discussed in detail below.

The release point approach 116 typically last for approximately 15 minutes. During release point approach 116 the bomb control unit is switched on. Mission 1 (or which ever other mission is appropriate) is selected, thereby defining the target coordinates. According to the preferred embodiment of the present invention a plurality of different missions, each having unique target coordinates, can be preprogrammed into the bomb control unit. Periodic ephemeris and pseudo-range corrections are broadcast from the bomb control unit 24 to the GPS guided munition 12 so as to enhance the accuracy of the guidance system thereof.

Release preparation 118 typically lasts for approximately 3 minutes. During release preparation 118 the bomb control unit provides steering cues to the pilot, based upon the aircraft's current position and velocity and the location of the target. The selected GPS guided munition initializes the navigation system thereof. Initialization of the calibration system of the GPS guided munition includes calibration of the inertial navigation system thereof. According to the preferred embodiment of the present invention initialization of the inertial guidance system of the GPS guided munition comprises calibration or zeroing of the roll rate gyroscope. This is accomplished by flying the plane as straight and level as possible so as to define the level, zero roll output of the roll rate gyroscope. During this time periodic ephemeris and pseudo-range corrections are broadcast from the bomb control unit 24 to the GPS guided munition 12.

The weapon separation 120 typically lasts for approximately two seconds. During weapon separation 120 one or more GPS guided munitions 12 are ejected or separated from the aircraft 10.

Roll stabilization 122 typically lasts approximately 3 seconds. During roll stabilization 122 an attempt is made to control the roll of the GPS guided munition 12 to as close to zero rate as possible. During this time the navigation system of the GPS guided munition 12 receives additional GPS position information via the civilian GPS receiver thereof.

Dead reckoning 124 typically lasts for approximately 5 seconds after release. During dead reckoning 124 the GPS guided munition 12 is guided toward the target utilizing a dead reckoning solution generated from the pre-released conditions of the GPS guided munition 12. Dead reckoning only preferably commences after the roll of the GPS guided munition is stabilized.

Dead reckoning typically ceases and GPS guidance takes over as soon as possible after launch. However, if the GPS signal is not available, e.g., is being jammed, then dead reckoning 124 continues until impact.

Guide to target 126 typically lasts approximately 17 to 35 seconds, depending upon the speed and altitude of the aircraft at release. Guide to target culminates with the impact of the GPS guided munition 12 upon the target. Thus, GPS corrections to the trajectory of the GPS guided munition 12 are constantly being made until impact.

Figure 10:
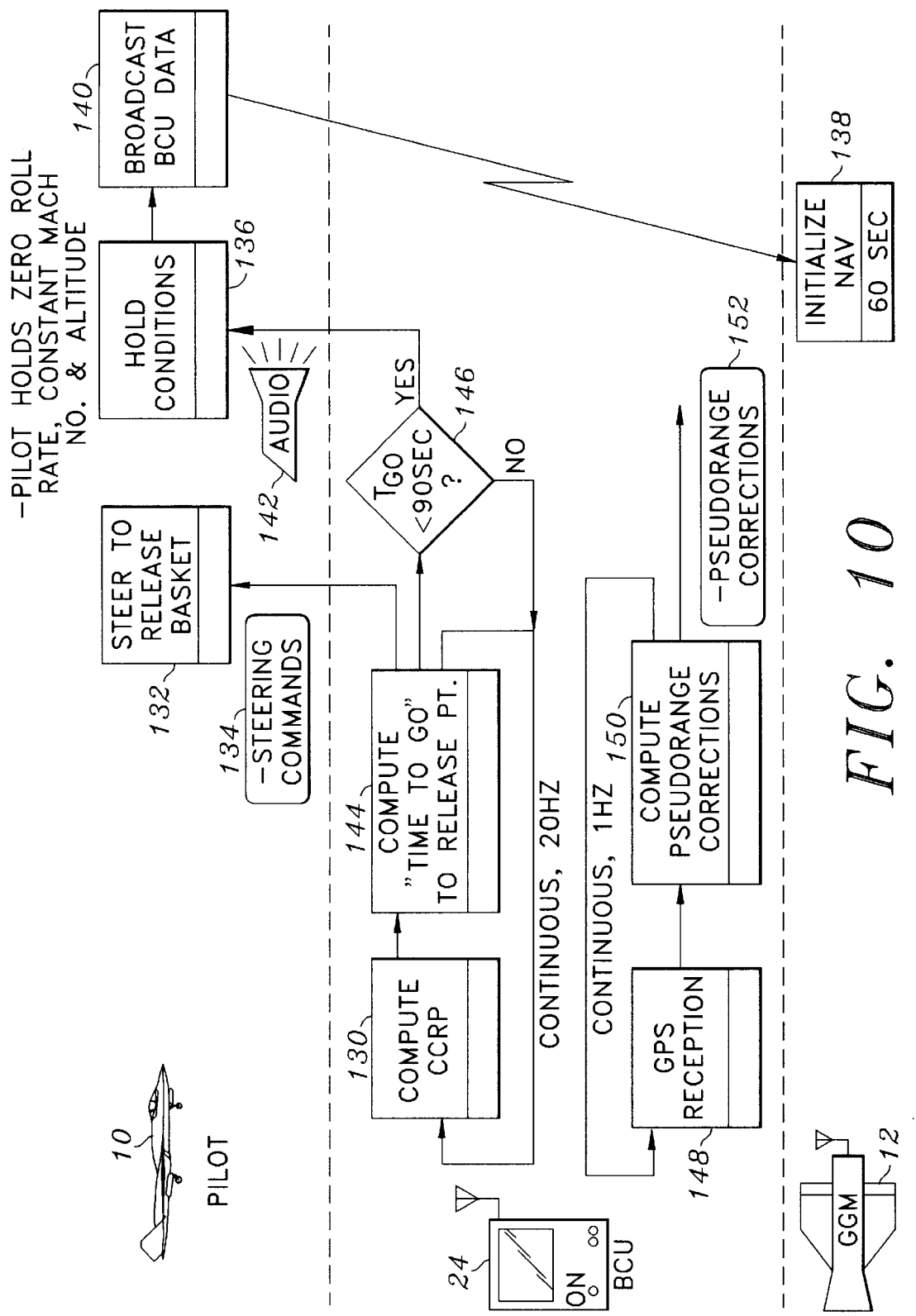
FIG. 10 is a flow chart showing launch preparation of the GPS guided munitions of the present invention.

Referring now to FIG. 10, launch preparation includes actions by the crew member, typically the pilot 26 of the aircraft 10; actions performed by the bomb control unit 24, and actions performed by the GPS guided munition 12. The crew member or pilot 26 steers 130 the aircraft 10 to the release basket, i.e., the point of release of the GPS guided munition(s). Utilizing steering commands 134 generated by the bomb control unit 24 based upon the current position and velocity of the aircraft, as well as the location of the target. The pilot is also required to hold zero roll rate and constant mach number and altitude, as hold conditions 136 are utilized to facilitate initialization 138 of the navigation system of the GPS guided munition 112. When the hold conditions are being applied, the bomb control unit broadcast 140 position information to the navigation system of the GPS guided munition 12. An audio signal generated by the bomb control unit 24 alerts pilot to the fact that information is being transmitted by the bomb control unit 24 to the GPS guided munition 12 and that it is thus necessary to maintain the hold conditions until the audio signal 142 ceases.

During launch separation the bomb control unit 24 calculates the continuously calculated release point (CCRP). The continuously calculated release point is used to calculate the time to go to release point 144. If 146 the time to go is less than 90 seconds, then audio signal 142 is generated by the bomb control unit 24 to alert the pilot that the whole conditions 136 must be applied. Prior to commencing of the audio signal 142, i.e., time to go to release point is greater than 90 second, the BCU continues to calculate the continuously computed release point (CCRP) and the time to go to release point 144.

During launch preparation the bomb control unit 24 also performs GPS recitation 148 and computes pseudo-range corrections 150 which are broadcast to the navigation system of the GPS guided munition 12 so as to facilitate enhanced accuracy thereof. Pseudo-range 152 corrections are provided by the BCU24 to the GPS guided munition 12.

Figure 11:
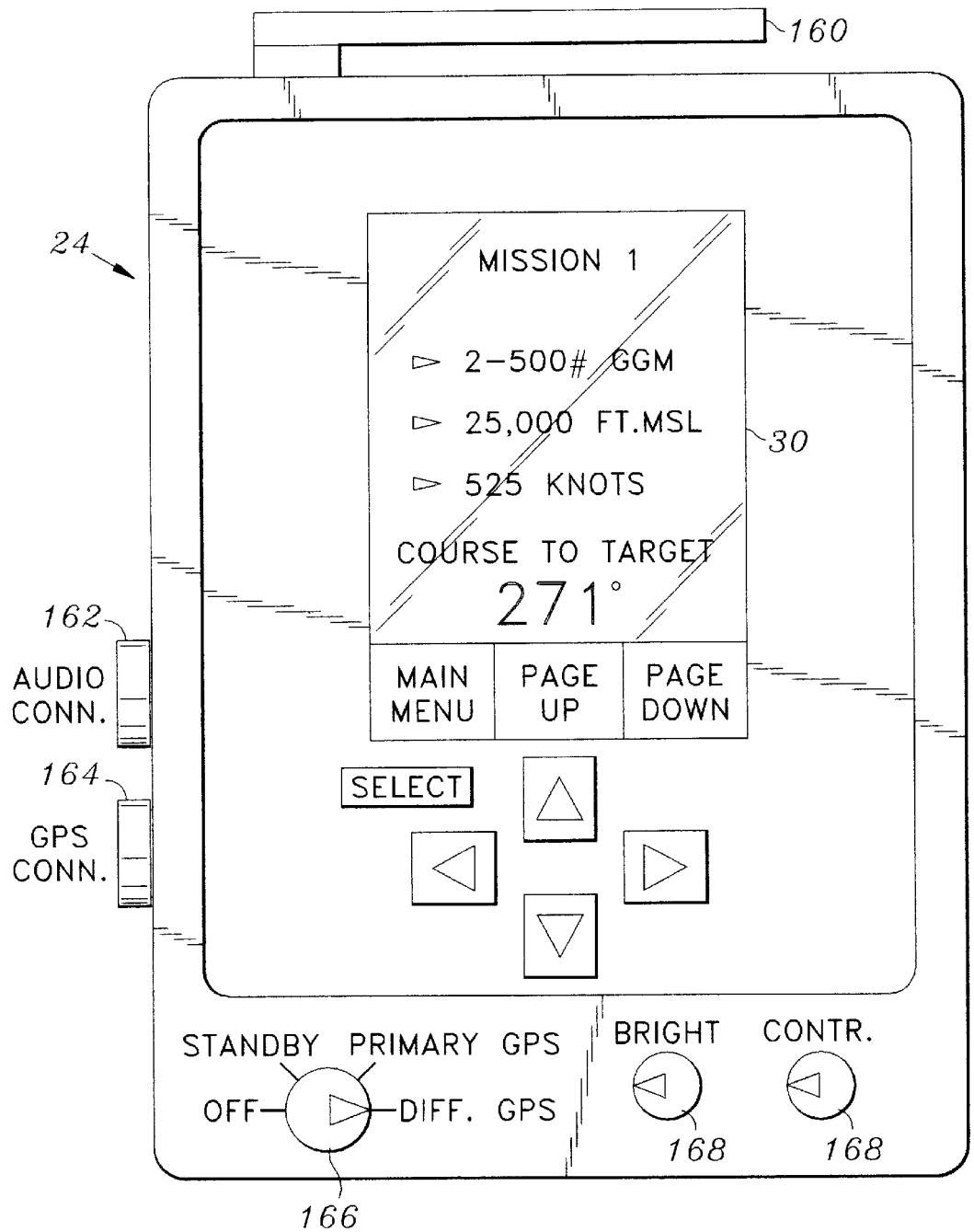
FIG. 11 is a top view of the bomb control unit of the present invention, showing the controls and display thereof.

Referring now to FIG. 11, the bomb control unit 24 preferably comprises a radio antenna 160 for broadcasting GPS data and control signals to the GPS guided munition 12. The bomb control unit 24 also comprises a display 30 which displays information regarding the GPS guided munition 12 and the target, as well as information regarding the flight of the aircraft 10. An audio connector 162 facilitates the provision of an audio signal to the pilot to indicate that the pilot is to fly the aircraft 10 on a straight and level so as to facilitate calibration of the inertial guidance system of the GPS guided munition 12. A GPS connector 164 facilitates connection to an external GPS antenna, preferably mounted within the aircraft cockpit. A selector switch 166 allows the bomb control unit to be turned off, placed in a stand-by mode, to broadcast primary GPS, i.e., position data, or operate in a differential mode, i.e., providing an error or differential GPS signal. Brightness and contrast controls 168 adjust the brightness and contrast of the display 30, as desired.

Figure 12:
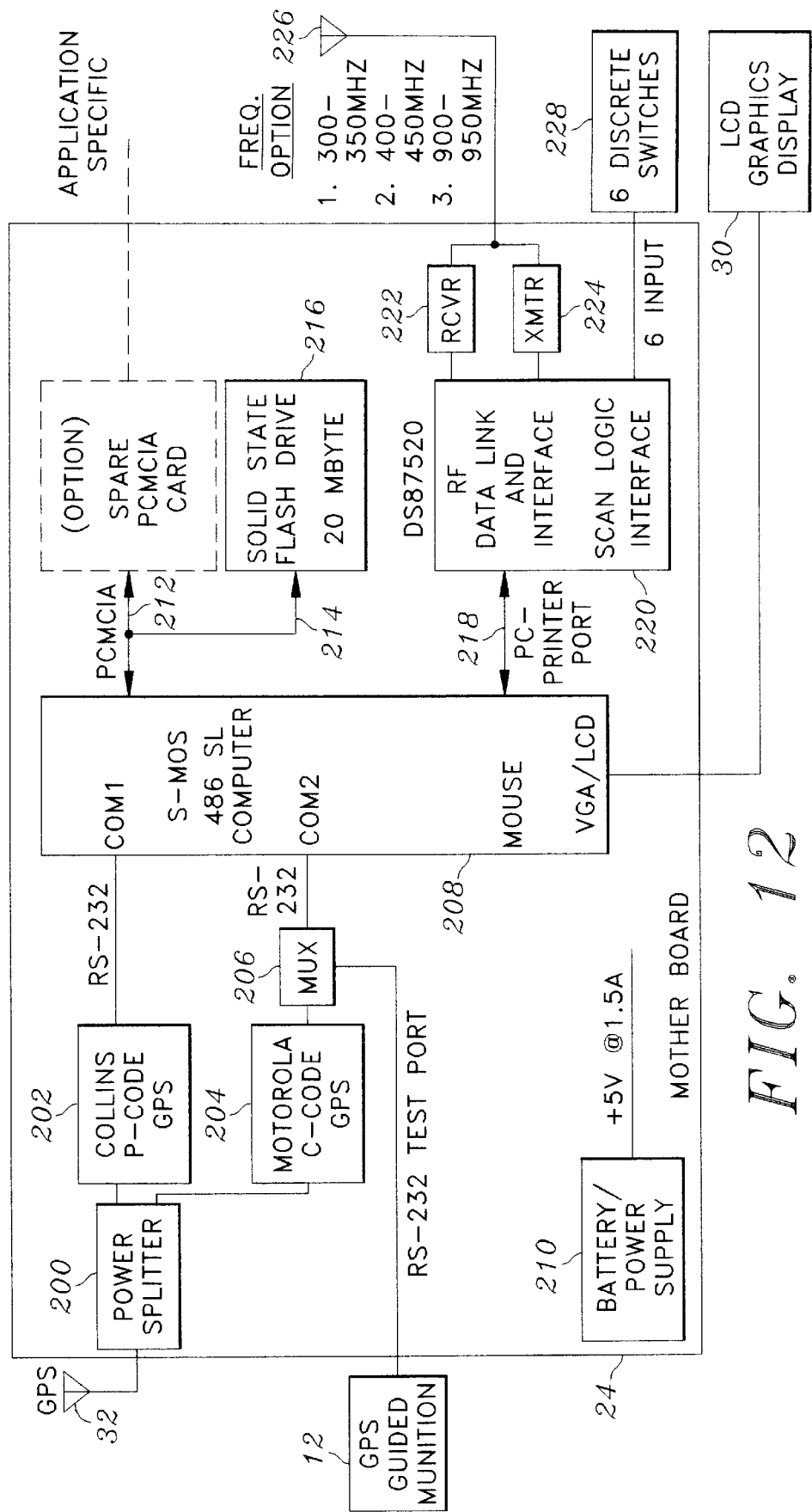
FIG. 12 is a block diagram of the bomb control unit of the present invention.

Referring now to FIG. 12, according to the preferred embodiment of the present invention, the bomb control unit 24 comprises a GPS antenna 32 which provides a signal to power splitter 200. The power splitter provides outputs to Collins p-code GPS 202 and motorolla c-code GPS 204. A multiplexor 206 provides an R2-232 output to a built in 4865L computer and an output to the comtuport of a built in 486 SL computer 208. The RS-232 output of the Collins P-code GPS 202 is provided to come 1 of the 4864 computer 208.

According to the preferred embodiment of the present invention the bomb control unit 24 further comprises a test port to facilitate electrical communication with the GPS guided munition 12 during system testing. Battery power supply 210 provides an internal source of electrical power, so as to facilitate autonomous operation of the bomb control unit 24.

Further, according to the preferred embodiment of the present invention, the 486 SL computer 208 has first 212 and second 214 PCMCIA interfaces. The first PCMCIA interface 212 may either be a spare PCM CIA interface or may be utilized for any specific application desired. The second PCMCIA interface 214 is used to facilitate communication with a solid state flash drive 216, preferably having a capacity of approximately 20 mega bytes.

The 486SL computer 208 preferably further comprises the provision for a pointing device such as a track ball or mouse. Alternatively, a touch screen or other pointing of the device may be utilized. The 486SL computer preferably provides an output to an LCD graphics display 230.

According to the preferred embodiment of the present invention the 486 SL computer 208 further comprises a pc printer port 218 which provides data to an RF data link and interface/scan logic interface 220. The RF data link and interface/scan logic interface is in electrical communication with a radio receiver 222 and a radio transmitter 224 which share common radio antenna 226. Six discreet switches 228 provide inputs to the RF data link and inter link/scan logic interface 220 and facilitate the input of a unique identification code to the bomb control unit such that the bomb control unit only communicates with the desired GPS guided munition.

Figure 13:
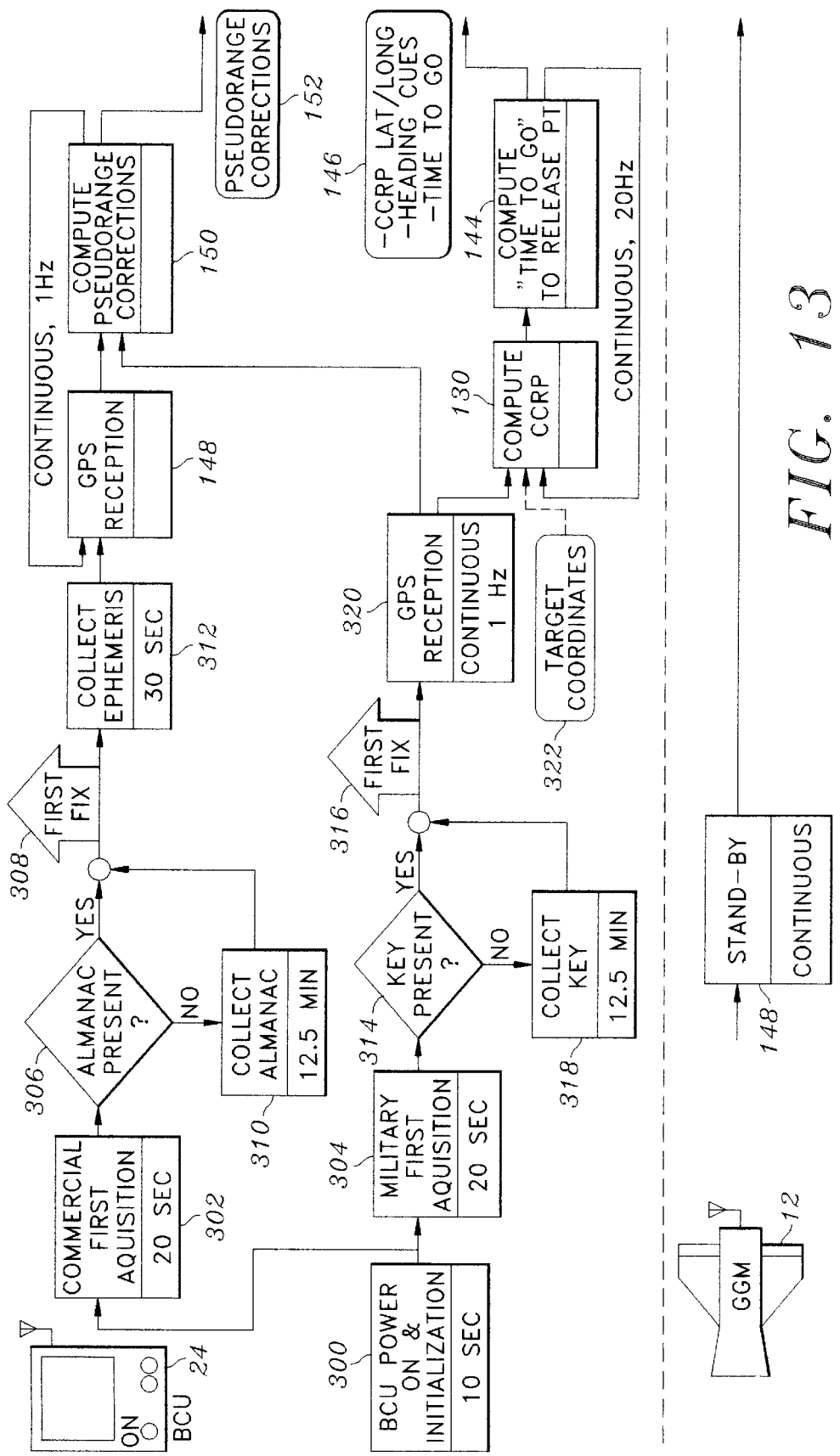
FIG. 13 is a flow chart showing initialization of the bomb control unit of the present invention.

Referring now to FIG. 13, during initialization of the bomb control unit 24 the pilot first turns the bomb control unit 24 on 300. This causes first acquisition 302 by the commercial GPS receiver and first acquisition 304 by the military GPS receiver. First acquisition 302 by the commercial GPS receiver and first acquisition 304 by the military GPS receiver generally takes approximately 20 seconds. If 306 the almanac is present then a first fix 308 is provided. If 306 the almanac is not present, then the almanac is collected 310. Collection of the almanac typically takes approximately 12.5 minutes. After the first fix 308, the ephemeris is collected 312. This generally takes approximately 30 seconds. GPS reception commences 148 and the computation of pseudo range corrections 150 is accomplished. GPS reception 148 in the computation of pseudo range corrections generally occurs at a frequency of approximately 1 Hz. Pseudo range correction are then provided to the GPS guided munition 12.

For the military GPS receiver, a check is made to verify that the key is present 314. If the key is present, the a first fix 316 is provided by the military GPS receiver. Otherwise the key is collected 318 and then the first fix 316 is provided. GPS 320 reception then continues at a rate of approximately 1 Hz. Target coordinates 322 are provided to facilitate the computation 130 of the continuously computed release point. The continuously computed release point is used to compute 144 the time to go. The process of computing the continuously computed release point and the time to go continues at a rage of approximately 20 Hz. The continuously computed release point longitude and latitude is used to compute heading cues which provide indications to the pilot of the desired heading to the release point and also to compute time to go 146. The GPS guided munition 12 remains continuously in a stand by mode 148 until launch preparation begins.

Figure 14:
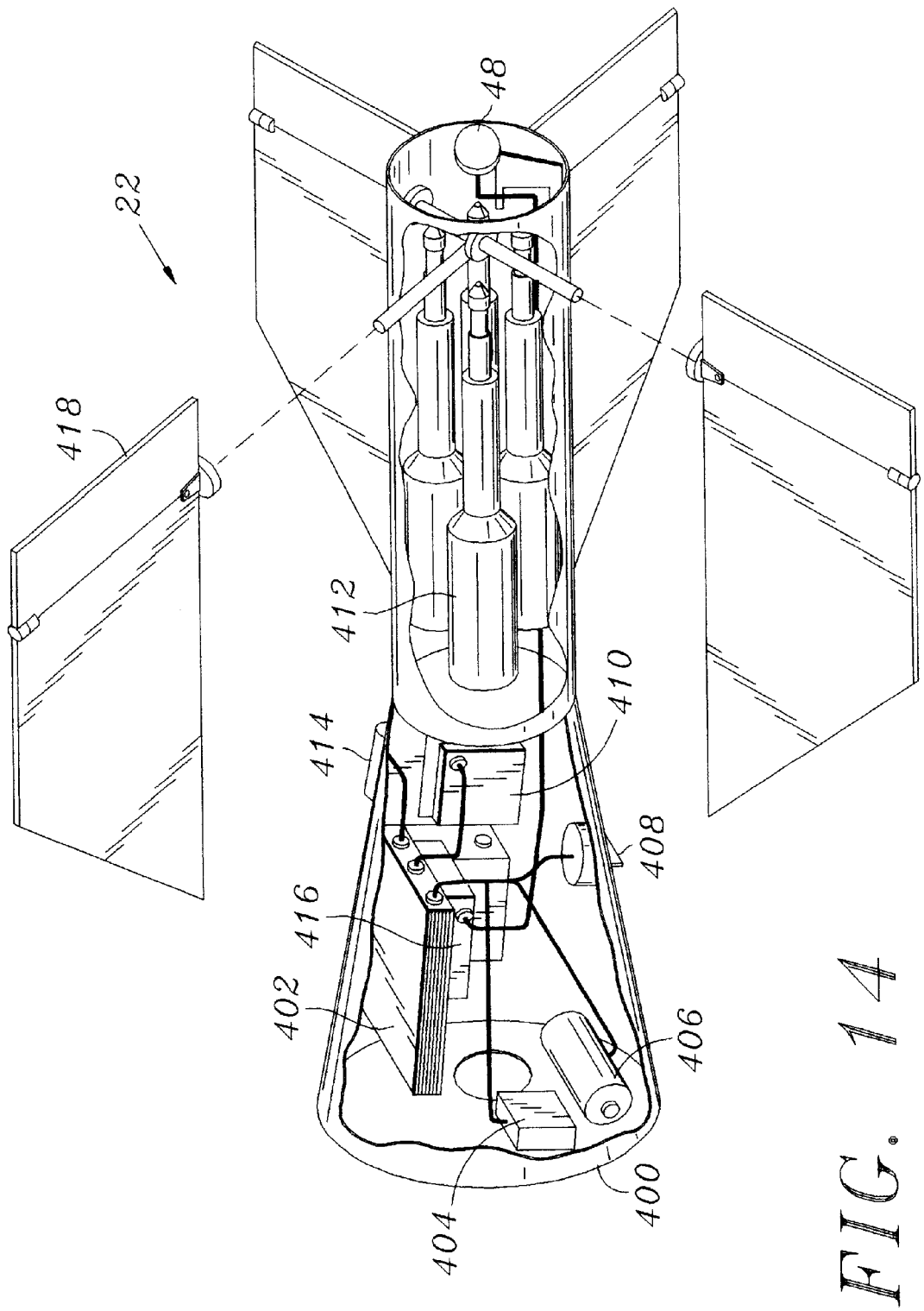
FIG. 14 is a fragmentary perspective view, showing the tail fin kit (TK10) of the present invention, including the guidance and flight control components thereof.

Referring now to FIG. 14, a tail kit for the GPS guided munition of the present invention comprises a housing 400 which is mechanically attachable to the back end of a munition, such as the MK82/EU2 500 pound bomb.

The discussion and illustration of a MK82/EU2 500 pound bomb herein is by way of illustration only and not by way of limitation. Those skilled in the art will appreciate that the GPS guided munition of the present invention may be utilized with various other existing munitions and may even be utilized in a custom design munition, if desired.

The electronics module 402 comprises electronic circuitry for interfacing the amplitude sensor 404 thermal battery 406, ram air generator 408, radio 410, control actuators 412, separation sensor 414, and GPS receiver 416. The amplitude sensor 404 contains an inertial navigation system comprising at least a roll rate gyroscope. The thermal battery 406 provides power for operating the electronics and control actuators after release prior to and after release of the GPS guided munition 12. Optionally, a ram air generator 408 provides power or augments the output of the thermal battery 406 after release of the GPS guided munition 12. The radio 410 facilitates communication with the bomb control unit 24.

According to the preferred embodiment of the present invention, four individual control actuators 412 provide for independent control surfaces or fins 418. Such independent control of the fins facilitates the use of various different flight control strategies such as bank to turn, skid-to-turn, etc. As those skilled in the art will appreciate, fewer than four control actuators 412 may be utilized, as desired.

The GPS antenna 48 located on the aft end of the GPS guided munition 12 facilities the reception of position information from the GPS satellites via the civilian GPS receiver 416.

Separation sensor 414 provides an indication that the GPS guided munition 12 has been released from the aircraft 10, so as to initiate autonomous operation of the GPS guided munition 12.

Figure 15:
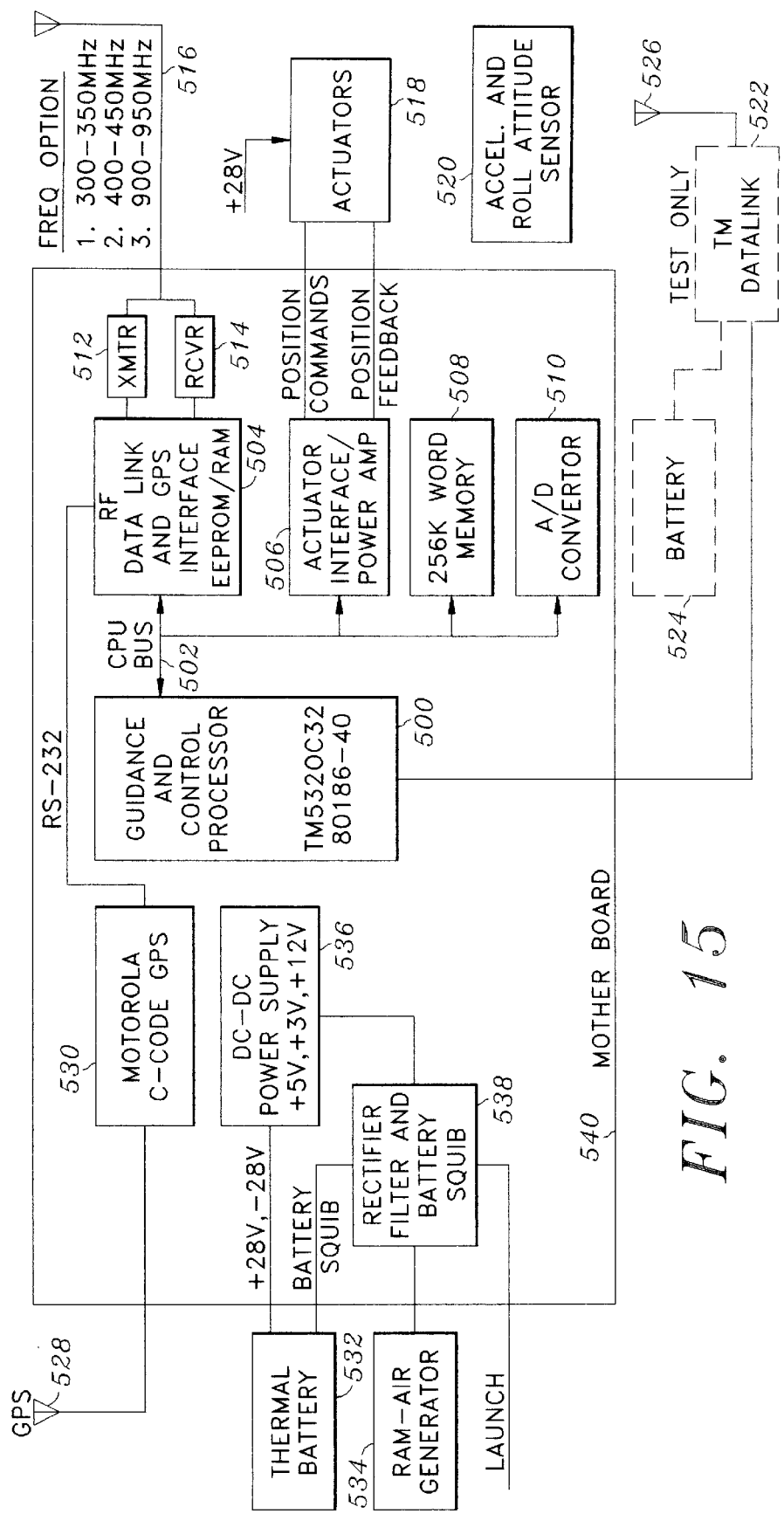
FIG. 15 is a baseline block diagram of the tail fin kit of the present invention.

Referring now to FIG. 15, according to an alternative configuration of the present invention, the guidance and control processor comprises a 40 MHz 80106 processor 500 and using a CPU bus architecture 502 wherein the radio frequency data link and GPS interface EEPROM/RAM 504, the actuator interface/power amp 506, the 256 K word memory 508, and the analog digital converter 510 all sit on the CPU bus 502. A transmitter 512 and a receiver 514 are in electrical communication with the RF data link and GPS interface EEPROM/RAM 504 and share a common GPS antenna 516. The actuator interface/power amp provides position commands to the actuators 518 and receives proficient feedback therefrom. The analog to digital converter 510 receives signals from the accelerometers, if used, and the roll attitude sensor, i.e., roll rate gyroscope 520.

According to the preferred embodiment of this alternative configuration of the invention the guidance and control processor 500 is in communication with a data link 522 which is powered by a battery 524 and is used for test purposes only. The data link 522 has an antenna which may be utilized to simulate signals from the bomb control unit 24.

GPS antenna 528 is in communication with the motorolla C-code GPS 530 which provides a RS 232 output to the RF data link and GPS interface EEPROM/RAM 504. A thermal battery 532 and/or a ram air generator 534 cooperate with DC-DC power supply 536 and rectifier filter and battery squib 538 to provide electrical power. According to this preferred embodiment of the present invention the rectifier filter and battery squib 538, DC-DC power supply 536, Motorola C-Code GPS 530, guidance and control processor 500, RF data link and GPS interface EEPROM/RAM 504, actuator interface/power amp 506, 256 k word memory 508, analog to digital converter 510, transmitter 512 and receiver 514 are all disposed upon a single motherboard 540. However, those skilled in the art will appreciate that various other configurations of these components are likewise suitable.

Figure 16:
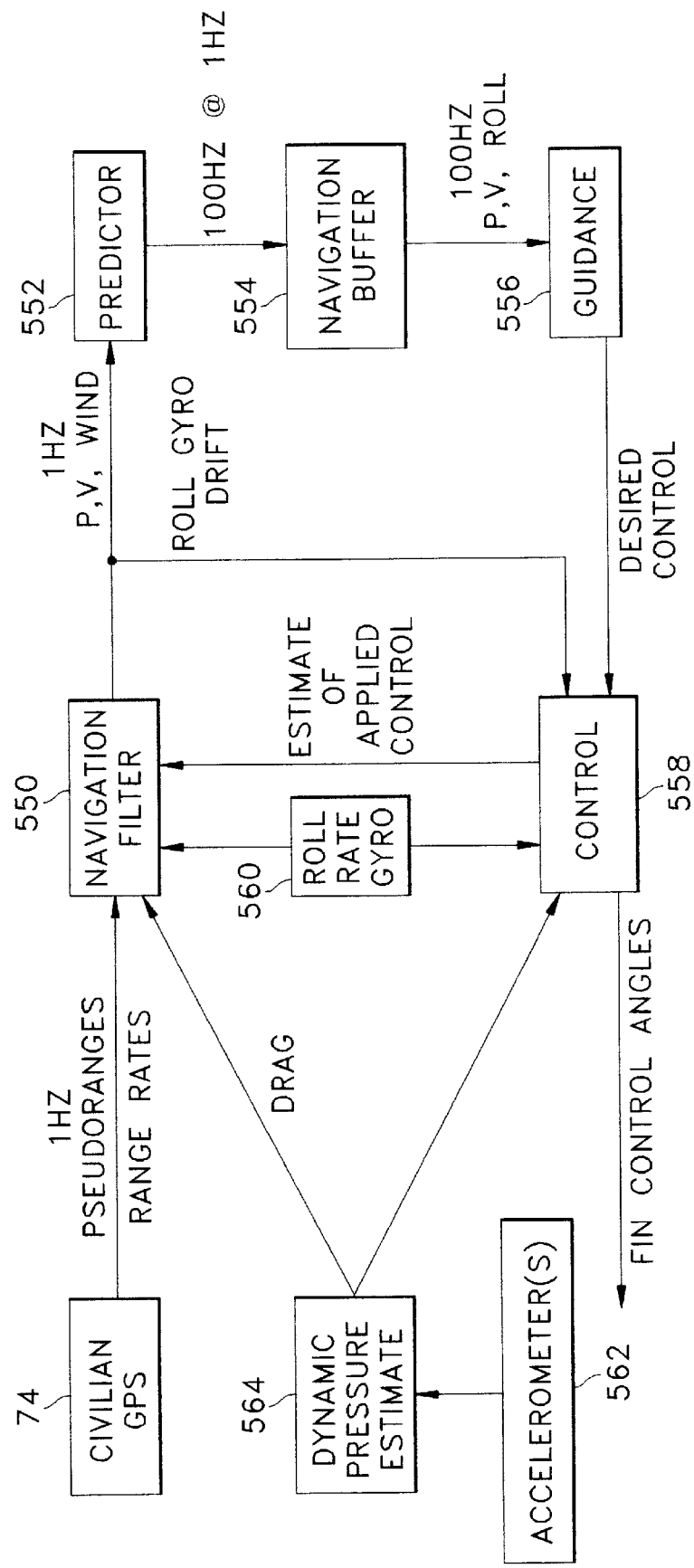
FIG. 16 is a flow chart illustrating operation of the tail fin kit according to the present invention.

Referring now to FIG. 16, a block diagram illustrating the operation of the navigation and flight control system of the GPS guided munition 12 is provided. The civilian GPS receiver 74 provides pseudo ranges and rage rates to navigation filter 550 which then provides position, velocity, and wind information to predictor 552.

Predictor 552 provides a 100 Hz at 1 Hz signal to navigation buffer 554 the navigation buffer 544 provides a 100 Hz position velocity and roll signal to guidance 556. Guidance 556 provides a control signal to control 558. Control 558 provides fin control angles to the flight control system and receives the output of navigation filter 550. Control 558 also provides and estimate of the applied control to navigation filter 550. Roll rate gyro 560 provides outputs to both the navigation filter 550 and control 558. Optional accelerometers 562, if utilized, provide an output to dynamic pressure estimate 564 from which drag can be calculated and provided to navigation filter 550. The dynamic pressure estimate 564 also provides an output to control 558.

Figure 17:
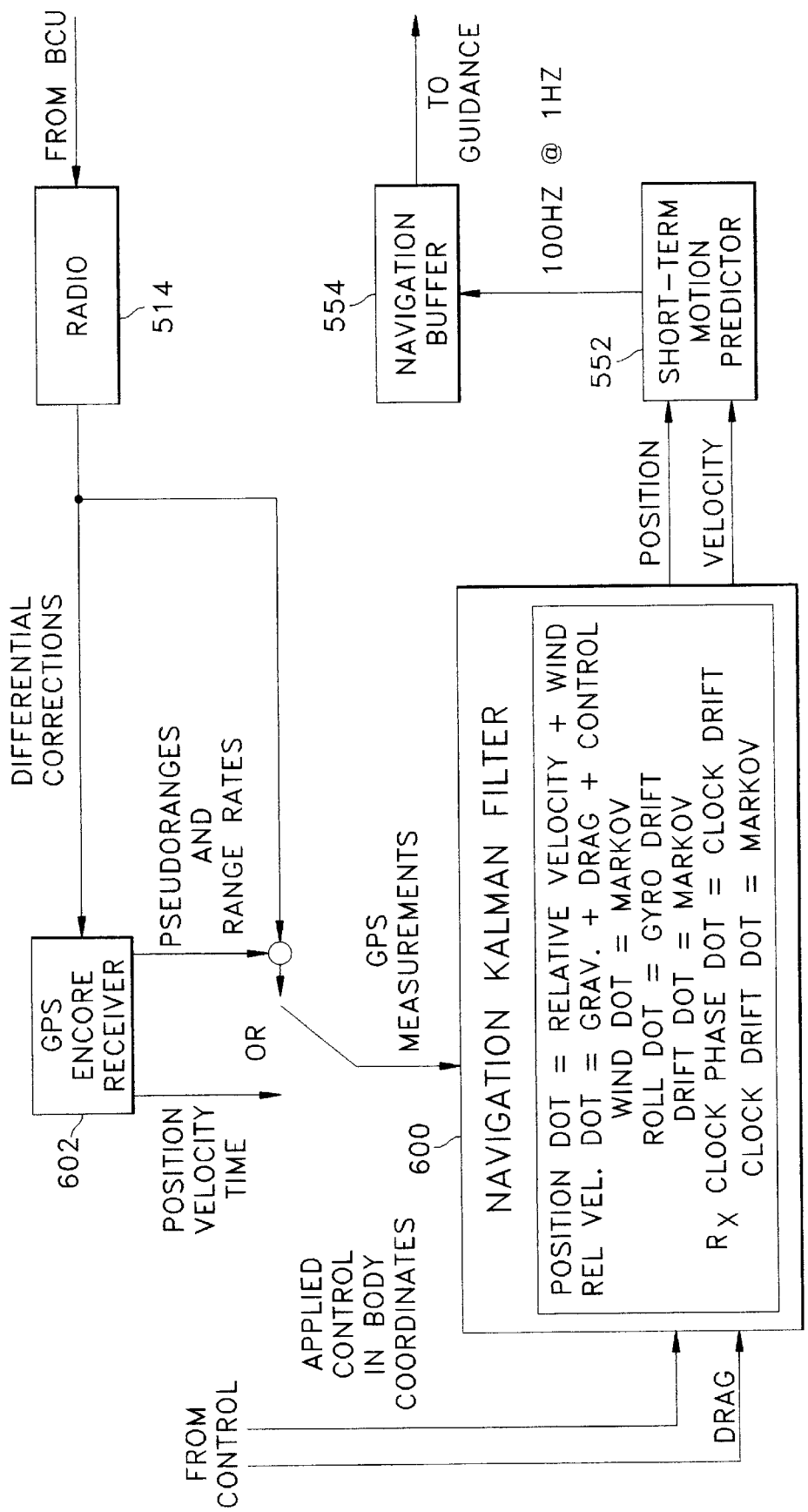
FIG. 17 is a block diagram of the navigation devices of the tail fin kit according to the present invention, showing the Kalman filter thereof.

Referring now to FIG. 17 the control of FIG. 16 provides drag and applied control and body coordinates to navigation Kalman filter 600. GPS Encore 602 receiver, the civilian GPS receiver, provides either positioned velocity time data or pseudo ranges and rate ranges to the navigation Kelman filter 600. The radio receiver 514 provides differential corrections to the GPS Encore receiver 602 or pseudo ranges and range rates to the navigation Kelman filter 600. The navigation Kelman filter 600 provides position and velocity data to short term motion predictor, which provides a 100 Hz at 1 Hz output to navigation buffer 554. The navigation buffer provides an output signal to guidance as shown in FIG. 16.

It is understood that the exemplary GPS guidance munition described and shown in the drawings represent only presently preferred embodiments of the invention. Indeed, various modifications and additions may be made to such embodiments without departing from the spirit and scope of the invention. For example, those skilled in the art will appreciate the various different types of munitions, e.g., missiles, bombs, artillery shells, etc. may utilize the GPS guidance of the present invention. Also, the GPS guidance of the present invention need not necessarily be limited to air launch/dropped munitions. Thus, these and other modifications and additions may be obvious to those skilled in the art and may be implemented to adapt the present invention for use in a variety of different applications.

What is claimed is:

1. A weapon system for an aircraft launchable munition comprising:
 a) a bomb control unit having:
  i) a housing;
  ii) a control unit C/A-code global positioning system (GPS) receiver disposed within the housing, the control unit C/A-code GPS receiver being operative to receive GPS satellite signals and generate a control unit C/A-code GPS location signal therefrom;
  iii) a control unit P-code GPS receiver disposed within the housing, the control unit P-code GPS receiver being operative to receive GPS satellite signals and generate a control unit P-code GPS location signal therefrom;
  iv) a bomb control processor disposed within the housing and in electrical communication with the control unit C/A code GPS receiver and the control unit P-code GPS receiver, the processor being operative to generate a GPS error signal responsive to the difference between the control unit C/A code GPS location signal and the control unit P-code GPS location signal; and
  v) a transmitter disposed within the housing and in electrical communication with the processor, the transmitter being operative to transmit the GPS error signal only before launch of the munition; and
 b) an air launchable munition attachable to the aircraft, the munition having:
  i) an internal guidance system disposed within the munition and having a munition C/A code GPS receiver operative to receive GPS satellite signals and generate a munition C/A code GPS location signal therefrom, the guidance system being configured to receive the GPS error signal only before launch of the munition and generate an actuator control signal responsive to the GPS error signal and the munition C/A code GPS location signal only after release of the munition;
  ii) at least one translatable flight control surface disposed along an outer surface of the munition; and
  iii) an actuator mechanism disposed within the munition and mechanically coupled to the flight control surface and in electrical communication with the guidance system, the actuator mechanism being operative to control the flight control surface in response to the actuator control signal.

2. The weapon system of claim 1 wherein the bomb control unit transmitter is a RF transmitter to transmit the GPS error signal before launch of the munition and the munition comprises a RF receiver to receive the GPS error signal.

3. The weapon system of claim 1 wherein the bomb control processor is configured to generate the GPS error signal having ephemeris and pseudo-range corrections that represent the difference between the control unit C/A code GPS location signal and the control unit P-code GPS location signal.

4. The weapon system of claim 1 wherein the bomb control unit further comprises an internal power supply disposed within the housing and operative to power the bomb control unit independent from the aircraft.

5. The weapon system of claim 1 wherein the housing is configured for attachment to a leg of a crew member of the aircraft.

6. A tail fin assembly mountable to an air launchable munition and for use with a bomb control unit operative to transmit a RF GPS error signal generated from a control unit C/A code GPS receiver and a control unit P-code GPS receiver, the tail fin assembly comprising:
 a) at least one translatable flight control surface projecting outwardly from the tail fin assembly;

b) a guidance system disposed within the tail fin assembly having:
  i) a munition C/A code GPS receiver configured to receive a GPS satellite signal and generate a munition C/A code GPS location signal therefrom;
  ii) a tail fin receiver configured to receive the RF GPS error signal from the bomb control unit before launch of the munition; and
  iii) a guidance and control processor in electrical communication with the munition C/A code GPS receiver and the tail fin receiver, the guidance and control processor being operative to generate a guidance control signal responsive to the munition C/A code GPS location signal and the GPS error signal; and
c) an actuator mechanism in electrical communication with the guidance system and mechanically coupled to the flight control surface, the actuator mechanism being configured to control the flight control surface solely in response to the guidance control signal.

7. The tail fin assembly of claim 6 wherein the flight control surface comprises at least three fins.

8. The tail fin assembly of claim 6 wherein the GPS error signal comprises ephemeris and pseudo-range corrections that represent the difference between the control unit C/A code GPS signal and the control unit P-code GPS location signal.

9. The tail fin assembly of claim 6 wherein the tail fin receiver is configured to receive RF signals from the bomb control unit only before launch of the munition.

10. A bomb control unit for an air launchable GPS guided munition, comprising:
  a) a housing;
  b) a control unit P-code GPS receiver disposed within the housing, the control unit P-code GPS receiver being operative to receive GPS satellite signals and generate a control unit P-code GPS location signal therefrom;
  c) a control unit C/A code GPS receiver disposed within the housing, the control unit C/A code GPS receiver being operative to receive GPS satellite signals and generate a control unit C/A code GPS location signal therefrom;
  d) a bomb control processor disposed within the housing and in electrical communication with the control unit P-code GPS receiver and the control unit C/A code GPS receiver, the processor being configured to generate a GPS error signal responsive to the difference between the control unit P-code GPS location signal and the control unit C/A code GPS location signal; and
  e) a transmitter disposed within the housing and in electrical communication with the bomb control processor, the transmitter being configured to transmit the GPS error signal to the munition before launch.

11. The bomb control unit of claim 10 wherein the bomb control unit further comprises an internal power supply disposed within the housing and being operative to solely power the bomb control unit independent from the aircraft.

12. The bomb control unit of claim 10 wherein the housing is configured for attachment to a leg of a crew member.

13. The bomb control unit of claim 10 wherein the bomb control unit is configured to determine a continuously computed release point (CCRP) to facilitate launching of the munition at a desired target.

14. The bomb control unit of claim 10 wherein the bomb control unit transmitter is a RF transmitter to transmit the GPS error signal before launch of the munition.

15. The bomb control unit of claim 14 wherein the bomb control processor is configured to generate the GPS error signal having ephemeris and pseudo-range corrections that represent the difference between the control unit C/A code GPS signal and the control unit P-code GPS location signal.

16. A method for delivery of a munition from an aircraft to a target, the method comprising the steps of:
  a) determining a first location of the munition before launch with a bomb control unit C/A code GPS receiver;
  b) determining a second location of the munition before launch with a bomb control unit P-code GPS receiver wherein the second location is closer to an actual location of the munition than the first location;
  c) generating a GPS error signal before launch with a bomb control unit processor from the first location and the second location;
  d) communicating the GPS error signal to the munition;
  e) releasing the munition from the aircraft;
  f) determining an in-flight munition location from a munition C/A code GPS receiver disposed within the munition and the GPS error signal wherein an accuracy of the in-flight munition location is improved by the GPS error signal; and
  g) guiding the munition to the target from the in-flight location.

17. The method of claim 16 wherein step (c) further comprises calculating a continuously computed release point (CCRP) with the bomb control unit to facilitate release of the muntion.

18. The method of claim 17 further comprising preprogramming the bomb control unit with information representative of the targets location before determining a first location.

19. The method of claim 16 wherein step (c) comprises generating a GPS error signal having ephemeris and pseudo-range correction data that represent the difference between the first location and the second location.

* * * * *